United States Patent
Furumochi et al.

(10) Patent No.: US 12,401,913 B2
(45) Date of Patent: Aug. 26, 2025

(54) APPARATUS THAT DETECTS FLICKER, METHOD OF CONTROLLING APPARATUS, AND STORAGE MEDIUM

(71) Applicant: CANON KABUSHIKI KAISHA, Tokyo (JP)

(72) Inventors: Hiroyuki Furumochi, Tokyo (JP); Natsumi Kosuga, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 112 days.

(21) Appl. No.: 18/509,510

(22) Filed: Nov. 15, 2023

(65) Prior Publication Data

US 2024/0171856 A1 May 23, 2024

(30) Foreign Application Priority Data

Nov. 21, 2022 (JP) .................. 2022-185559

(51) Int. Cl.
  *H04N 23/745* (2023.01)
  *H04N 23/667* (2023.01)
  *H04N 25/531* (2023.01)

(52) U.S. Cl.
  CPC ......... *H04N 23/745* (2023.01); *H04N 23/667* (2023.01); *H04N 25/531* (2023.01)

(58) Field of Classification Search
  CPC .... H04N 23/63; H04N 23/667; H04N 23/745; H04N 25/531
  See application file for complete search history.

(56) References Cited

U.S. PATENT DOCUMENTS

| | | | |
|---|---|---|---|
| 2015/0172529 A1* | 6/2015 | Aota | H04N 23/745 |
| | | | 348/228.1 |
| 2019/0037157 A1* | 1/2019 | Matsumura | H04N 25/51 |
| 2020/0154031 A1* | 5/2020 | Haraguchi | H04N 23/71 |

FOREIGN PATENT DOCUMENTS

| | | |
|---|---|---|
| JP | 6525525 B2 | 6/2019 |
| JP | 2021-190992 A | 12/2021 |

* cited by examiner

*Primary Examiner* — Daniel M Pasiewicz
(74) *Attorney, Agent, or Firm* — Cowan, Liebowitz & Latman, P.C.

(57) ABSTRACT

An image capturing apparatus includes an image sensor having a pixel area formed by pixels arranged in a matrix and output lines each for reading out a signal from the pixel area for each pixel row, and obtains a first image by performing image capturing. A flicker detection unit acquires flicker information on the first image, caused by a light source. The image sensor can operate in a first mode for reading out the first image, a second mode for reading out a second image as part of the first image during operation in the first mode, and a third mode for reading out a third image as part of the first image at a different timing from a readout timing in the second mode during operation in the first mode. The flicker information is acquired based on the second image and the third image.

20 Claims, 26 Drawing Sheets

FIG. 4A

| | READOUT ROW | NON-READOUT ROW |

1ST ROW: R G R G R G R G R G R G R G
2ND ROW: G B G B G B G B G B G B G B
3RD ROW: R G R G R G R G R G R G R G
4TH ROW: G B G B G B G B G B G B G B
5TH ROW: R G R G R G R G R G R G R G
6TH ROW: G B G B G B G B G B G B G B
7TH ROW: R G R G R G R G R G R G R G
8TH ROW: G B G B G B G B G B G B G B
9TH ROW: R G R G R G R G R G R G R G
10TH ROW: G B G B G B G B G B G B G B
11TH ROW: R G R G R G R G R G R G R G
12TH ROW: G B G B G B G B G B G B G B

FIG. 4B

| | READOUT ROW | NON-READOUT ROW |

1ST ROW: R G R G R G R G R G R G R G
2ND ROW: G B G B G B G B G B G B G B
3RD ROW: R G R G R G R G R G R G R G
4TH ROW: G B G B G B G B G B G B G B
5TH ROW: R G R G R G R G R G R G R G
6TH ROW: G B G B G B G B G B G B G B
7TH ROW: R G R G R G R G R G R G R G
8TH ROW: G B G B G B G B G B G B G B
9TH ROW: R G R G R G R G R G R G R G
10TH ROW: G B G B G B G B G B G B G B
11TH ROW: R G R G R G R G R G R G R G
12TH ROW: G B G B G B G B G B G B G B

FIG. 4C

| | READOUT ROW | NON-READOUT ROW |
|---|---|---|

| | | | | | | | | | | | | | | | |
|---|---|---|---|---|---|---|---|---|---|---|---|---|---|---|---|
| 1ST ROW | R | G | R | G | R | G | R | G | R | G | R | G | R | G | R | G |
| 2ND ROW | G | B | G | B | G | B | G | B | G | B | G | B | G | B | G | B |
| 3RD ROW | R | G | R | G | R | G | R | G | R | G | R | G | R | G | R | G |
| 4TH ROW | G | B | G | B | G | B | G | B | G | B | G | B | G | B | G | B |
| 5TH ROW | R | G | R | G | R | G | R | G | R | G | R | G | R | G | R | G |
| 6TH ROW | G | B | G | B | G | B | G | B | G | B | G | B | G | B | G | B |
| 7TH ROW | R | G | R | G | R | G | R | G | R | G | R | G | R | G | R | G |
| 8TH ROW | G | B | G | B | G | B | G | B | G | B | G | B | G | B | G | B |
| 9TH ROW | R | G | R | G | R | G | R | G | R | G | R | G | R | G | R | G |
| 10TH ROW | G | B | G | B | G | B | G | B | G | B | G | B | G | B | G | B |
| 11TH ROW | R | G | R | G | R | G | R | G | R | G | R | G | R | G | R | G |
| 12TH ROW | G | B | G | B | G | B | G | B | G | B | G | B | G | B | G | B |

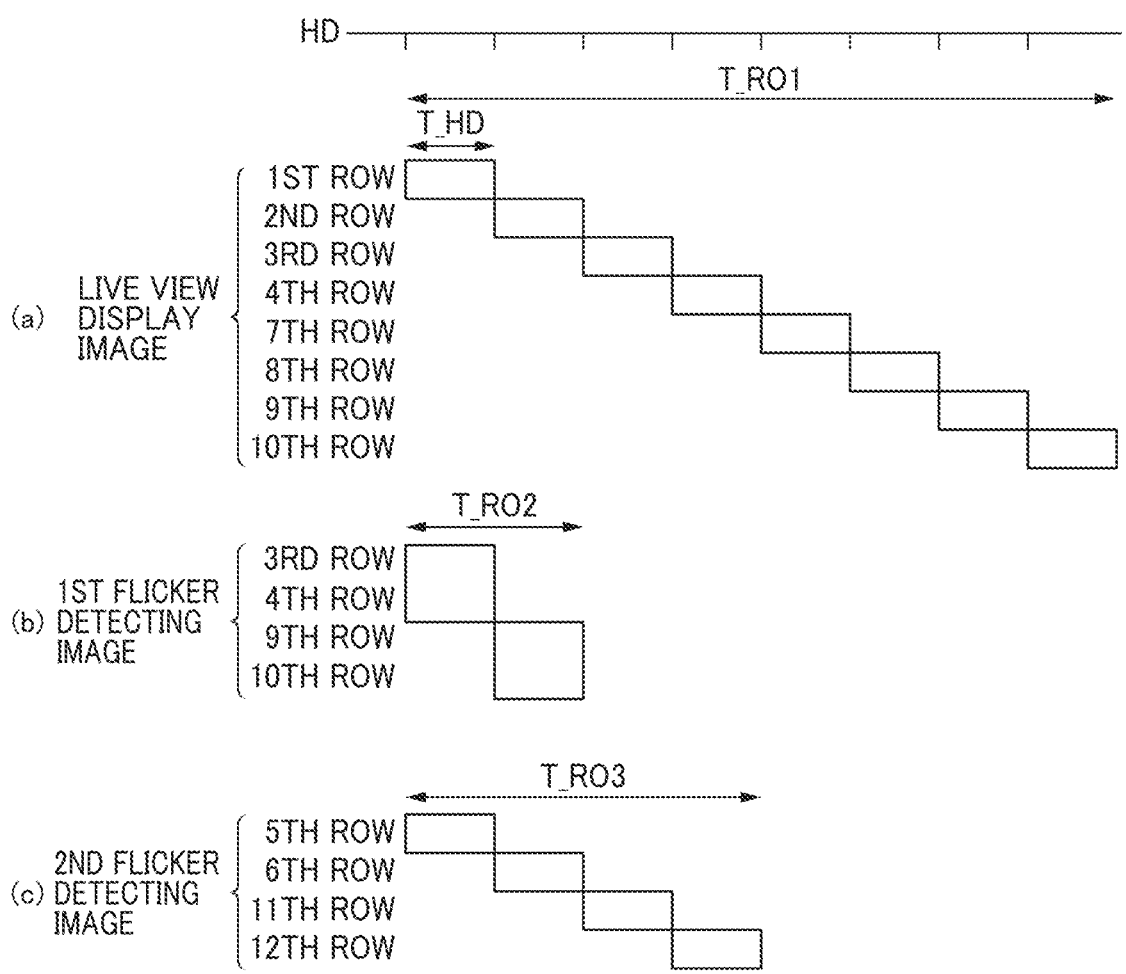

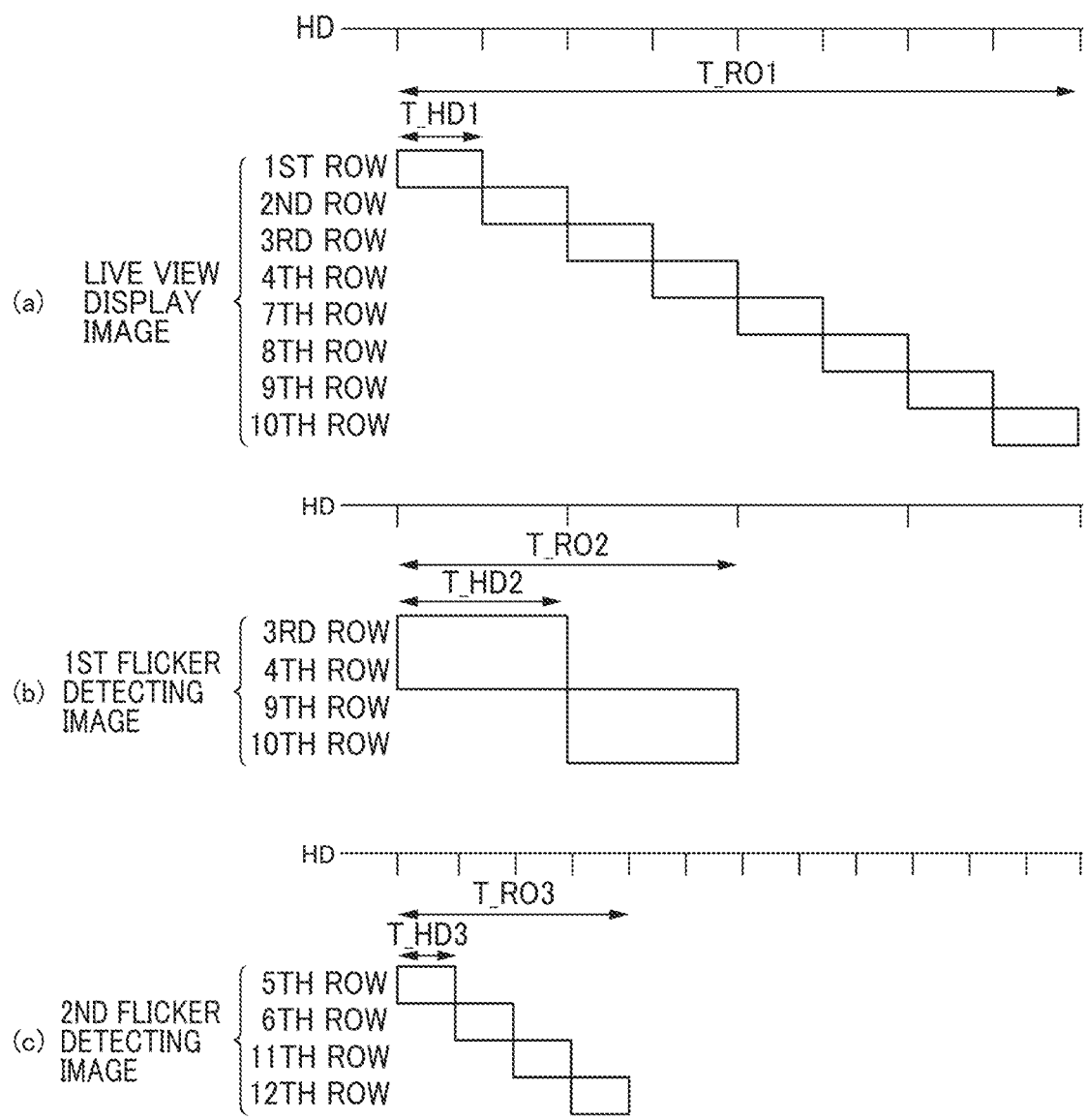

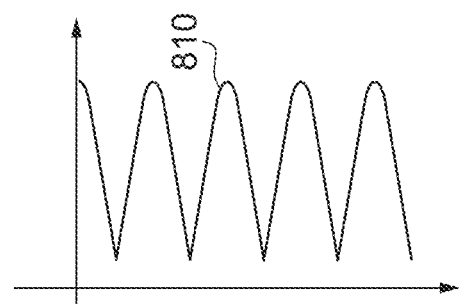
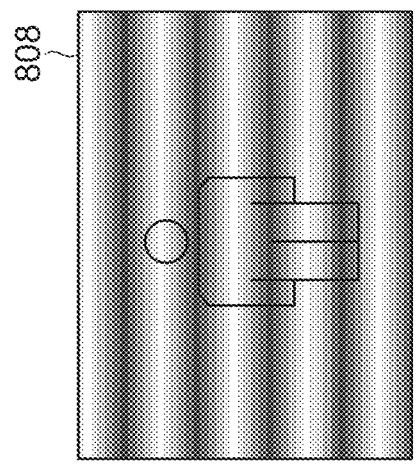
FIG. 8B
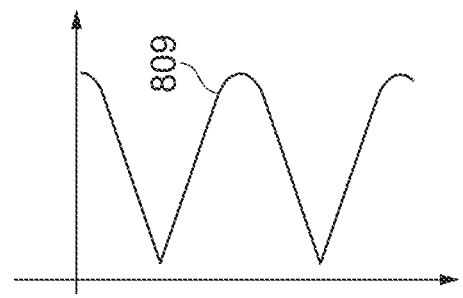
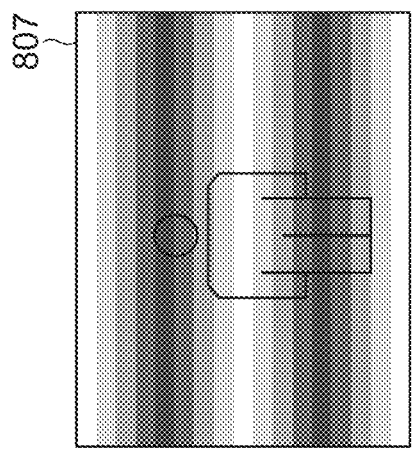

FIG. 11A

| | | | | | | | | | | | | | | | |
|---|---|---|---|---|---|---|---|---|---|---|---|---|---|---|---|
| | 200 | READOUT ROW | | | | | | | | | | | | | 100 |

| | | | | | | | | | | | | | | |
|---|---|---|---|---|---|---|---|---|---|---|---|---|---|---|
| 1ST ROW | R | G | R | G | R | G | R | G | R | G | R | G | R | G |
| 2ND ROW | G | B | G | B | G | B | G | B | G | B | G | B | G | B |
| 3RD ROW | R | G | R | G | R | G | R | G | R | G | R | G | R | G |
| 4TH ROW | G | B | G | B | G | B | G | B | G | B | G | B | G | B |
| 5TH ROW | R | G | R | G | R | G | R | G | R | G | R | G | R | G |
| 6TH ROW | G | B | G | B | G | B | G | B | G | B | G | B | G | B |
| 7TH ROW | R | G | R | G | R | G | R | G | R | G | R | G | R | G |
| 8TH ROW | G | B | G | B | G | B | G | B | G | B | G | B | G | B |
| 9TH ROW | R | G | R | G | R | G | R | G | R | G | R | G | R | G |
| 10TH ROW | G | B | G | B | G | B | G | B | G | B | G | B | G | B |
| 11TH ROW | R | G | R | G | R | G | R | G | R | G | R | G | R | G |
| 12TH ROW | G | B | G | B | G | B | G | B | G | B | G | B | G | B |

| | 200 | READOUT ROW | NON-READOUT ROW | 100 |

| | | | | | | | | | | | | | | |
|---|---|---|---|---|---|---|---|---|---|---|---|---|---|---|
| 1ST ROW | R | G | R | G | R | G | R | G | R | G | R | G | R | G |
| 2ND ROW | G | B | G | B | G | B | G | B | G | B | G | B | G | B |
| 3RD ROW | R | G | R | G | R | G | R | G | R | G | R | G | R | G |
| 4TH ROW | G | B | G | B | G | B | G | B | G | B | G | B | G | B |
| 5TH ROW | R | G | R | G | R | G | R | G | R | G | R | G | R | G |
| 6TH ROW | G | B | G | B | G | B | G | B | G | B | G | B | G | B |
| 7TH ROW | R | G | R | G | R | G | R | G | R | G | R | G | R | G |
| 8TH ROW | G | B | G | B | G | B | G | B | G | B | G | B | G | B |
| 9TH ROW | R | G | R | G | R | G | R | G | R | G | R | G | R | G |
| 10TH ROW | G | B | G | B | G | B | G | B | G | B | G | B | G | B |
| 11TH ROW | R | G | R | G | R | G | R | G | R | G | R | G | R | G |
| 12TH ROW | G | B | G | B | G | B | G | B | G | B | G | B | G | B |

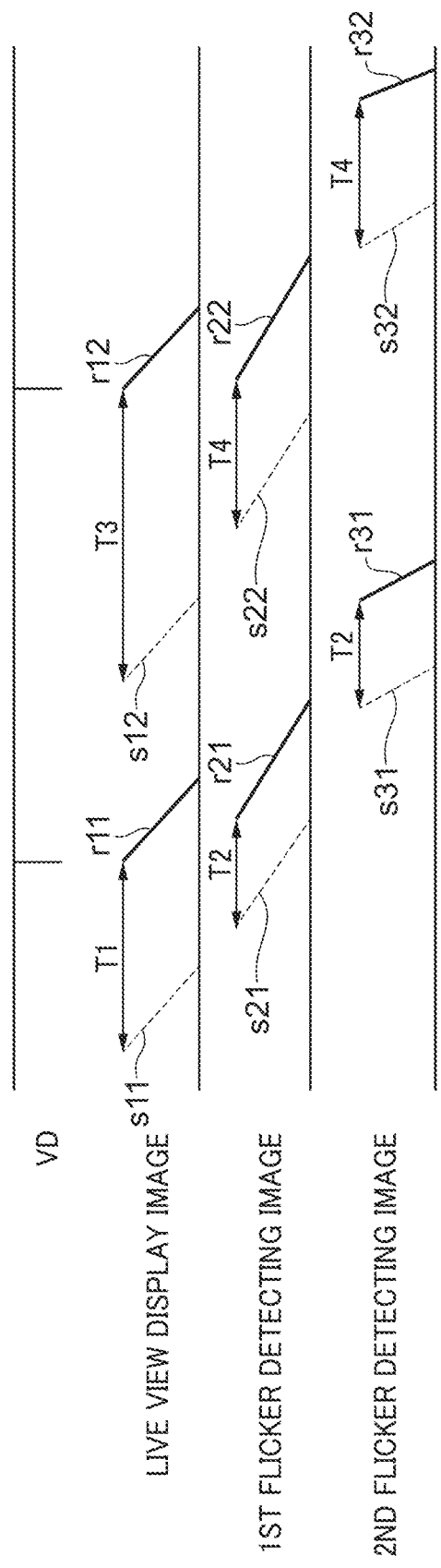

APPARATUS THAT DETECTS FLICKER, METHOD OF CONTROLLING APPARATUS, AND STORAGE MEDIUM

BACKGROUND

Field

The aspect of the embodiments relates to an apparatus that detects flicker, a method of controlling the apparatus, and a storage medium.

Description of the Related Art

There is a case where photographing is performed under a light source (hereinafter referred to as the "flicker light source") that periodically repeats blinking, such as a fluorescent light. In this case, depending on the influence of exposure timing, time required to read out signals from pixels, and the like, periodic changes in the luminance value can be caused within one image. This sometimes results in flicker causing stripes to appear in an image. Japanese Patent No. 6525525 and Japanese Laid-Open Patent Publication (Kokai) No. 2021-190992 disclose means for detecting such periodic changes in the luminance value in an image, i.e. flicker.

Japanese Patent No. 6525525 discloses, as the means for detecting flicker, a configuration in which signals of two images different in accumulation time are accumulated in parallel and differences between these two image signals are integrated for detection of flicker. Japanese Laid-Open Patent Publication (Kokai) No. 2021-190992 discloses, as the means for detecting flicker, a configuration in which a plurality of images for flicker detection are periodically read out between frames of an image, which are periodically read out for live view display of the image, and flicker is detected based on evaluation values of these images.

SUMMARY

According to an aspect of the present embodiments, there are provided an image capturing apparatus that is capable of detecting flicker during image capturing of a live view image, regardless of the frequency of a light source, while preventing influence on image capturing conditions, such as exposure time, a method of controlling the image capturing apparatus, and a storage medium.

In a first aspect of the present disclosure, there is provided an apparatus including an image capturing unit configured to have a pixel area formed by a plurality of pixels arranged in a matrix and a plurality of output lines each of which reads out a signal from the pixel area for each of rows of the pixels, and obtain a captured image by performing image capturing, and a flicker information acquisition unit configured to acquire flicker information on flicker of the captured image caused by a light source, wherein the image capturing unit is capable of operating in a first readout mode in which signals of a first image formed by the captured image are each read out on a row-by-row basis, in a second readout mode in which signals of a second image formed by part of the captured image are each read out on a row-by-row basis, during operation in the first readout mode, and in a third readout mode in which signals of a third image formed by part of the captured image are each read out on a row-by-row basis, in a timing different from a timing of the second readout mode, during operation in the first readout mode, wherein the flicker information acquisition unit can acquire the flicker information based on the second image and the third image.

In a second aspect of the present disclosure, there is provided a method for controlling an apparatus, including obtaining a captured image by performing image capturing, by using a pixel area formed by a plurality of pixels arranged in a matrix and a plurality of output lines each of which reads out a signal from the pixel area for each of rows of the pixels, and acquiring flicker information on flicker of the captured image caused by a light source, wherein the capturing of the captured image is capable of being performed in a first readout mode in which signals of a first image formed by the captured image are each read out on a row-by-row basis, in a second readout mode in which signals of a second image formed by part of the captured image are each read out on a row-by-row basis, during operation in the first readout mode, and in a third readout mode in which signals of a third image formed by part of the captured image are each read out on a row-by-row basis, in a timing different from a timing of the second readout mode, during operation in the first readout mode, wherein the acquiring of the flicker information can be performed based on the second image and the third image.

According to the present disclosure, it is possible to detect flicker during image capturing of a live view image regardless of the frequency of a light source while preventing influence on image capturing conditions, such as exposure time.

Further features of the present disclosure will become apparent from the following description of exemplary embodiments (with reference to the attached drawings).

BRIEF DESCRIPTION OF THE DRAWINGS

FIG. 4A is a diagram showing how signals are read out from the image sensor for a live view image (first image).

FIG. 4B is a diagram showing how signals are read out from the image sensor for a first flicker detecting image (second image).

FIG. 4C is a diagram showing how signals are read out from the image sensor for a second flicker detecting image (third image).

FIG. 5A is a diagram showing a relationship between a pixel row from which signals are read out according to a horizontal synchronization signal (HD) and a readout time period.

FIG. 5B is a diagram showing a relationship between a pixel row from which signals are read out and a readout time period, when one HD period is changed.

FIG. 8B is a diagram schematically showing average values of luminance values of pixels included in pixel rows for the flicker detecting image.

FIG. 11A is a diagram showing how signals are read out from the image sensor for the live view image (first image).

FIG. 11B is a diagram showing how signals are read out from the image sensor for the first flicker detecting image (second image).

FIG. 11C is a diagram showing how signals are read out from the image sensor for the second flicker detecting image (third image).

FIG. 14A is a diagram showing how signals are read out from the image sensor for the live view image (first image).

FIG. 14B is a diagram showing how signals are read out from the image sensor for the first flicker detecting image (second image).

FIG. 14C is a diagram showing how signals are read out from the image sensor for the second flicker detecting image (third image).

FIG. 19A is a diagram showing how signals are read out from the image sensor for the live view image (first image).

FIG. 19B is a diagram showing how signals are read out from the image sensor for the first flicker detecting image (second image).

FIG. 19C is a diagram showing how signals are read out from the image sensor for the second flicker detecting image (third image).

FIG. 20 is a timing diagram showing the operations of capturing the live view image, the first flicker detecting image, and the second flicker detecting image.

DESCRIPTION OF THE EMBODIMENTS

Preferable exemplary embodiments of the disclosure will now be described in detail below with reference to the accompanying drawings showing embodiments thereof. However, the following description of the configuration of the embodiments is given by way of example, and the scope of the present disclosure is not limited to the described configuration of the embodiments. For example, each component of the present disclosure can be replaced by a desired component which can exhibit the same function. Further, a desired component can be added. Further, two or more desired components (features) of the embodiments can be combined.

Figure 1:
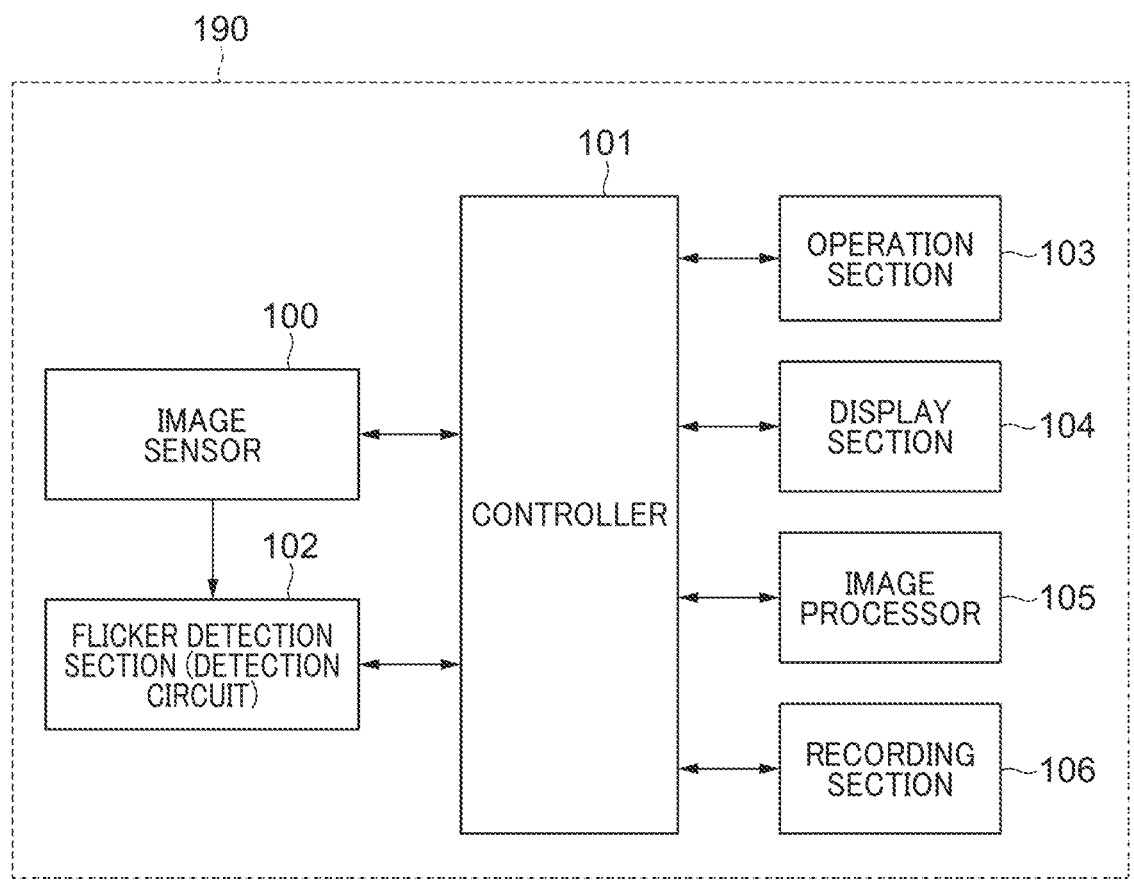
FIG. 1 is a block diagram showing a hardware configuration of an image capturing apparatus according to a first embodiment of the present disclosure.

A first embodiment of the present disclosure will be described below with reference to FIGS. 1 to 9. FIG. 1 is a block diagram showing an example of hardware configuration of an image capturing apparatus according to the first embodiment. The image capturing apparatus shown in FIG. 1, denoted by reference numeral 190, is, for example, a digital camera, and has a still image photographing function for photographing a still image and a moving image photographing function for photographing a moving image. This image capturing apparatus 190 includes an image sensor (image capturing unit) 100, a controller 101, a flicker detection unit (flicker information acquisition unit) 102, an operation unit 103, a display unit 104, an image processor 105, and a recording unit 106.

The image sensor 100 receives light transmitted thorough an optical system, such as a lens for causing light reflected from an object, to form an image, not shown, and converts the resulting optical image to electrical signals. Then, the image sensor 100 outputs a captured image by converting the electrical signals to digital image data. Further, the image sensor 100 can capture an image of an object in a state in which light is irradiated from a light source. As this light source, a light source (hereinafter sometimes referred to as the "flicker light source") that periodically repeats blinking, such as a fluorescent light or an LED illumination, is used. In this case, flicker is sometimes caused by the flicker light source. The flicker detection unit 102 detects and acquires flicker information on this flicker based on a plurality of image signals obtained from the image sensor 100.

The controller 101 is communicably connected to the image sensor 100, the flicker detection unit 102, the operation unit 103, the display unit 104, the image processor 105, and the recording unit 106 and controls the operations of these components, i.e. the overall operation of the image capturing apparatus 190. Although not shown in FIG. 1, the image capturing apparatus 190 also has a storage unit storing programs for causing the controller 101 as a computer to execute the control of each component (method of controlling the image capturing apparatus).

The operation unit 103 includes a main switch for starting the image capturing apparatus 190, a photographing switch used by a user to provide a command for photographing a still image or a moving image to the image capturing apparatus 190, and so forth. Further, the switches included in the operation unit 103 include a switch for starting the flicker detection unit 102 to detect flicker. This switch is a switch for switching ON/OFF of flicker detection performed by the flicker detection unit 102, and is normally in the OFF state but is switched to the ON state in a case where flicker detection (flicker elimination) is required. Note that the switch for switching ON/OFF of flicker detection is not particularly limited, but for example, a switch formed by hardware of a push-button type can be used, or a switch formed by software which can be displayed on the display unit 104 can be used.

Further, the operation unit 103 is also used when a variety of image capturing conditions are set. The display unit 104 displays a still image or a moving image, based on image data, and further displays a variety of menus, for example.

The image processor 105 performs processing for correcting a still image and a moving image, image compression processing, and so forth. Further, the image processor 105 performs predetermined calculation processing using image signals obtained from the image sensor 100 and performs auto exposure (AE) processing based on a result of the calculation processing. The recording unit 106 records image data and so forth.

Figure 2:
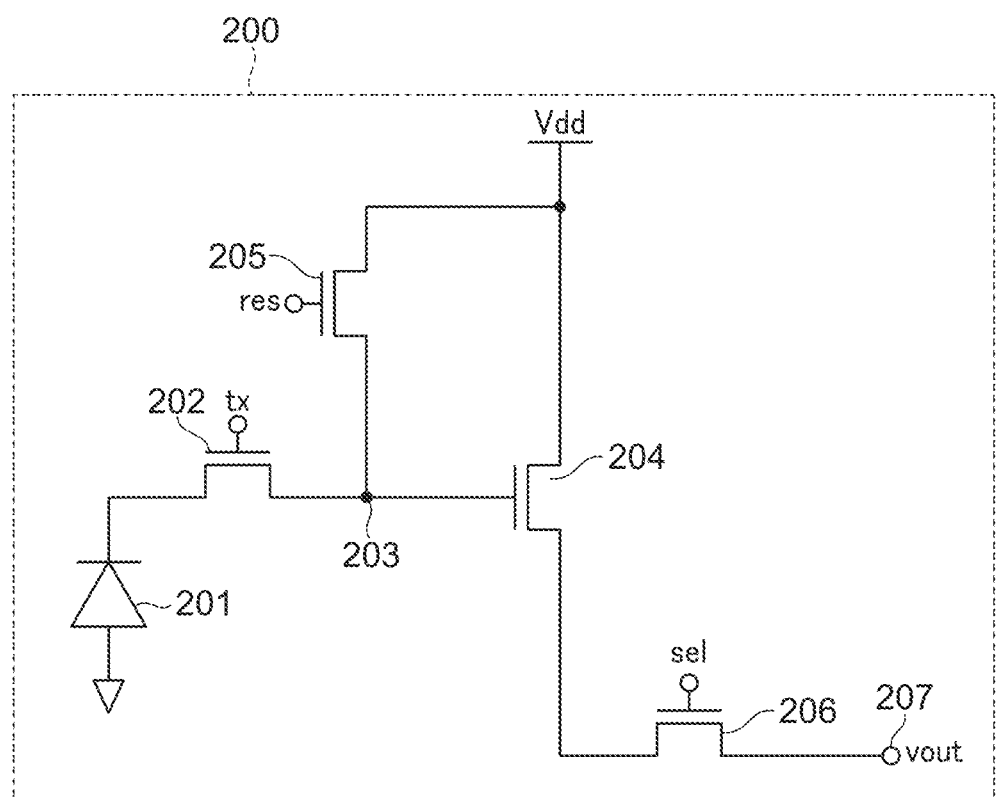
FIG. 2 is a circuit diagram of a pixel included in an image sensor.

FIG. 2 is a circuit diagram of one of pixels included in the image sensor. A pixel 200 shown in FIG. 2 includes a photo diode (PD) 201, a transfer gate 202, a floating diffusion (FD) portion 203, an amplification metal oxide semiconductor (MOS) transistor 204, a reset switch 205, a pixel selection switch 206, an output terminal (vout) 207.

The photo diode 201 functions as a photoelectric conversion element that performs photoelectrical conversion of an incident optical signal and accumulates an electric charge commensurate with an amount of exposure. When a control signal tx output from a vertical scanning circuit (not shown) is set to a high level, the transfer gate 202 is brought into an on-state (conductive state). This causes the electric charge accumulated in the photo diode 201 to be transferred to the floating diffusion portion 203. The floating diffusion portion 203 is connected to a gate of the amplification MOS transistor 204. The amplification MOS transistor 204 outputs a voltage signal corresponding to the amount of the electric charge transferred from the photo diode 201 to the floating diffusion portion 203.

The reset switch 205 is a switch for resetting the electric charge in the floating diffusion portion 203 and the photo diode 201. When a control signal res output from the vertical scanning circuit is set to a high level, the reset switch 205 is brought into an on-state (conductive state). With this, the floating diffusion portion 203 is reset. Further, to reset the electric charge accumulated in the photo diode 201, the control signal tx and the control signal res are simultaneously set to the high level to thereby bring the transfer gate 202 and the reset switch 205 into the on-state, respectively. This resets the photo diode 201 via the floating diffusion portion 203.

When a control signal sel output from the vertical scanning circuit is set to a high level, the pixel selection switch 206 is brought into an on-state (conductive state). This brings the amplification MOS transistor 204 and the output terminal 207 into a connected state. With this connected state, a pixel signal converted to a voltage by the amplification MOS transistor 204 is output to the output terminal 207. At this time, by controlling the ON/OFF of the pixel selection switch 206 using the control signal sel and thereby adjusting the row of pixels from which pixel signals are read out, it is possible to output image signals while changing a thinning ratio of the pixel rows.

Figure 3:
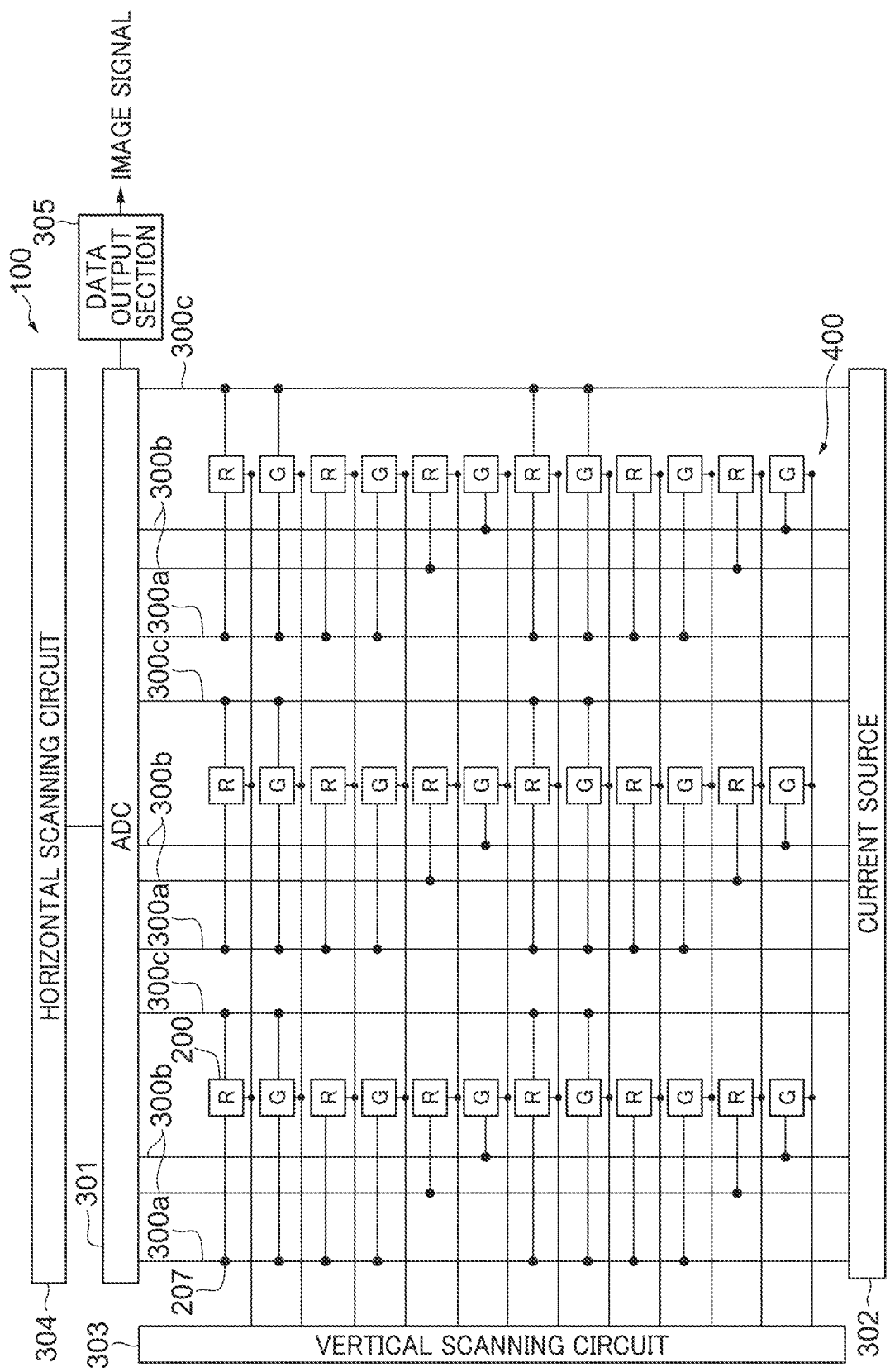
FIG. 3 is a diagram showing a circuit configuration of the image sensor.

FIG. 3 is a diagram showing a circuit configuration of the image sensor. As shown in FIG. 3, the image sensor 100 has a pixel area 400 formed by the plurality of pixels 200 arranged in a matrix. Although in the present embodiment, the pixels 200 in three columns×twelve rows are illustrated as a representative for ease of explanation, in actuality, hundreds of thousands to tens millions of pixels 200 are arranged in a matrix. Although only marks "R" and "G" appear in FIG. 3, the marks "R" and "G" and marks "B" added to the pixels 200 each represent a red color filter, a green color filter, and a blue color filter, respectively.

Further, the image sensor 100 includes vertical output lines 300a to 300c, an analog-to-digital converter (ADC) 301, a current source 302, a vertical scanning circuit 303, a horizontal scanning circuit 304, and a data output section 305. The vertical scanning circuit 303 supplies the control signals res, tx, sel, and the like to each pixel 200. The current source 302 is connected to the vertical output lines 300a to 300c. With this, the vertical output lines 300a to 300c can read out signals output from predetermined pixels 200 of the pixel area 400 on a row-by-row basis (for each array in a vertical direction in FIG. 3).

The vertical output lines 300a to 300c are connected to the input of the analog-to-digital converter 301. The analog-to-digital converter 301 converts a pixel signal output from each of the pixels 200 from analog to digital. Further, a source follower circuit is formed by the pixels 200 connected to the current source 302 and the vertical output lines 300a to 300c, and the amplification MOS transistor 204.

The horizontal scanning circuit 304 performs horizontal scan. The horizontal scanning circuit 304 sequentially repeats readout from each row. Then, in the analog-to-digital converter 301, pixel signals, which have been digitally converted, are output from the data output section 305 as a first image signal, a second image signal, and a third image signal. Each vertical output line 300a can read out the first image. Each vertical output line 300b can read out the second image. Each vertical output line 300c can read out the third image. Thus, the image sensor 100 is configured such that the vertical output lines are not shared for use in a first readout mode, a second readout mode, and a third readout mode, referred to hereinafter.

Further, a pixel area from which the vertical output line 300c reads out signals and a pixel area from which the vertical output line 300a reads out signals are shared. On the other hand, a pixel area from which the vertical output line 300b reads out signals is different from the pixel areas from which the vertical output line 300a and the vertical output line 300c read out signals. With this, accumulation of the second image and readout of image signals of the second image are performed independently of accumulation of the first image and the third image and readout of image signals of the first image and the third image.

Further, in the present embodiment, the number of vertical pixels is the same between the pixel area for the second image and the pixel area for the third image. On the other hand, the number of vertical output lines 300b for each column of pixels for reading out the second image is two, but the number of vertical output lines 300c for the column of pixels for reading out the third image is one. That is, the total number of vertical output lines 300b used in the second readout mode and the total number of vertical output lines 300c used in the third readout mode are different from each other.

Next, readout of the first image, the second image, and the third image, and the respective readout time periods will be described with reference to FIGS. 4A to 4C, 5A, and 5B. FIG. 4A is a diagram showing how signals are read out from the image sensor for a live view image (first image). FIG. 4B is a diagram showing how signals are read out from the image sensor for a first flicker detecting image (second image). FIG. 4C is a diagram showing how signals are read out from the image sensor for a second flicker detecting image (third image). Note that in FIGS. 4A to 4C, an unhatched area indicates readout pixels (readout rows), and a hatched area indicates non-readout pixels (non-readout rows) from which no signal is read out. The same is applied to FIGS. 11A to 11C, 14A to 14C, and 19A to 19C.

FIG. 5A is a diagram showing a relationship between a pixel row from which signals are read out according to a horizontal synchronization signal (HD) and a readout time period. FIG. 5B is a diagram showing a relationship between a pixel row from which signals are read out and a readout time period, when one HD period is changed. The "live view image (image for live view display)" refers to the captured image displayed on a liquid crystal screen included in the display unit 104 or an electronic viewfinder on a real-time basis and is normally a moving image. Further, in the present embodiment, the live view image is defined as the first image.

The image sensor 100 is configured to be controlled by the controller 101 such that the image sensor 100 can operate in the first readout mode, the second readout mode, and the third readout mode. The first readout mode is a mode for reading out the live view image (first image). The second readout mode is a mode for reading out the second image as part of the live view image during operation of the first readout mode. The third readout mode is a mode for reading out the third image as part of the live view image at a timing different from the readout timing of the second readout mode during operation of the first readout mode.

The second image and the third image are images used for flicker detection and are sometimes referred to as the first flicker detecting image and the second flicker detecting image, respectively. Further, when signals are read out from the pixels, signals are sequentially read out by the vertical output lines (any of the vertical output lines 300a to 300c) allocated within the pixel area 400 whenever a horizontal synchronization signal (HD) is issued.

As shown in FIGS. 4A to 4C, in the pixel area 400, sixteen pixels 200 are arranged, side by side, per row, and there are a total of twelve such rows.

In the first readout mode, with respect to R-G rows including pixels 200 on which the color filters R and G are disposed and G-B rows including pixels 200 on which the color filters G and B are disposed, signals are read out from four rows out of six rows in a six-row period (period of repetition of six rows). The pixel rows from which signals are read out in the illustrated example in FIG. 4A are the first to fourth rows and the seventh to tenth rows.

In the second readout mode, signals are read out from two rows out of the six rows in the six-row period. The pixel rows from which signals are read out in the illustrated example in FIG. 4B are the third and fourth rows, and the ninth and tenth rows, which are part of the pixel rows from which signals are read out for the live view image. In the third readout mode, signals are read out from two rows out of the six rows in the six-row period. The pixel rows from which signals are read out in the illustrated example in FIG. 4C are the fifth and sixth rows, and the eleventh and twelfth rows, which are different from the pixel rows from which signals are read out for the live view image.

A part (a) in FIG. 5A shows a relationship between the pixel rows from which signals are read out for the live view image according to the horizontal synchronization signal (HD) and time periods required to read out the signals. A part (b) in FIG. 5A shows a relationship between the pixel rows from which signals are read out for the first flicker detecting image according to the horizontal synchronization signal (HD) and time periods required to read out the signals. A part (c) in FIG. 5A shows a relationship between the pixel rows from which signals are read out for the second flicker detecting image according to the horizontal synchronization signal (HD) and time periods required to read out the signals.

A period T_HD represents one HD period, and each vertical output line reads out signals from an allocated pixel row during this period. Then, in the next HD period, the vertical output line reads out signals from the next pixel row. By repeating this readout operation, it is possible to read out signals from all allocated pixel rows in each readout mode.

A time T_RO1 is a time period required by the vertical output line 300a to read out signals from all of the pixel rows allocated to the live view image. A time T_RO2 is a time period required by the vertical output lines 300b to read out signals from all of the pixel rows allocated to the first flicker detecting image. A time T_RO3 is a time period required by the vertical output line 300c to read out signals from all of the pixel rows allocated to the second flicker detecting image.

As mentioned hereinabove, since the number of vertical output lines 300b for each column of pixels is two (see FIG. 3), signals are read out from the pixels of two rows during one HD period. Therefore, the signal readout time period can be expressed by the following equation (1):

$$\text{Signal readout time period [ms]} = 1\ \text{HD period [ms]} \times (\text{number of vertical pixels} \div \text{number of vertical output lines}) \quad (1)$$

Note that the "number of vertical pixels" refers to the number of rows of pixels in the pixel area allocated to each readout mode.

As described above, in both of the second readout mode and the third readout mode, signals are read out from the two rows out of the six rows in the six-row period. Therefore, the number of vertical pixels for the first flicker detecting image and the number of vertical pixels for the second flicker detecting image are the same as each other. For this reason, a difference between the readout time periods of the two images for flicker detection is defined by the number of vertical output lines for each flicker detecting image. For example, in the present embodiment, the two images for flicker detection have a ratio of the number of vertical pixels, set to 1:1, and have a ratio of the number of vertical output lines (the number of vertical output lines 300b: the number of vertical output lines 300c), set to 2:1. Thus, the ratio of the readout time periods of the two images for flicker detection is expressed by the following equation (2):

$$T\_RO2 : T\_RO3 = 1 \times 4 \div 2 : 1 \times 4 \div 1 = 1:2 \quad (2)$$

As described hereinafter, the two flicker detecting images used for flicker detection are required to be differentiated in readout timing from each other. In the present embodiment, by adjusting the number of vertical output lines 300 used in the second readout mode and the number of vertical output lines 300 used in the third readout mode, the second readout mode and the third readout mode can be operated at different timings. This makes it possible to easily differentiate the timings of reading out the two images for flicker detection.

Note that although in the present embodiment, signals are read out for the two images for flicker detection from different two rows out of the six rows in the six-row period, this is not limitative. For example, the number of rows of the readout pixels can be differentiated between the two images for flicker detection, or signals can be read out from the same pixel rows. Further, although when the signals are read out for the two images for flicker detection, the different vertical output lines are used, and the two vertical output lines for each column of pixels and the one vertical output line for the column of pixels are used, respectively, this is not limitative. For example, the pixel signals can be read out by the same vertical output lines for the two images for flicker detection. In any case, in the image capturing apparatus 190, the timings of reading out signals for the two images for flicker detection are only required to be differentiated by adjusting the number of vertical pixels from which signals are read out and the number of vertical output lines.

Note that in the image capturing apparatus 190, the timings of reading out signals for the two images for flicker detection can be differentiated by changing the one HD period. In FIG. 5B, a period T_HD 1 represents one HD period of the live view image. A period T_HD 2 represents one HD period of the first flicker detecting image. A period T_HD 3 represents one HD period of the second flicker detecting image. Then, the ratio of one HD period between the images for flicker detection is adjusted to be 3:1. Thus, in the present embodiment, the period of reading out signals for the first flicker detecting image in the second readout mode and the period of reading out signals for the second flicker detecting image in the third readout mode are different from each other. As described above, the readout time period can be expressed by the above equation (1). Therefore, the ratio of readout time period between the two images for flicker detection is expressed by the following equation (3):

$$T\_RO2 : T\_RO3 = 3 \times 4 \div 2 : 1 \times 4 \div 1 = 3 : 2 \qquad (3)$$

Thus, by changing the one HD period by software, it is possible to differentiate the readout timings of the two images for flicker detection. With this, it is possible to adjust the readout timings without changing the configuration of hardware of the image sensor 100 (such as the number of vertical output lines).

Figure 6:
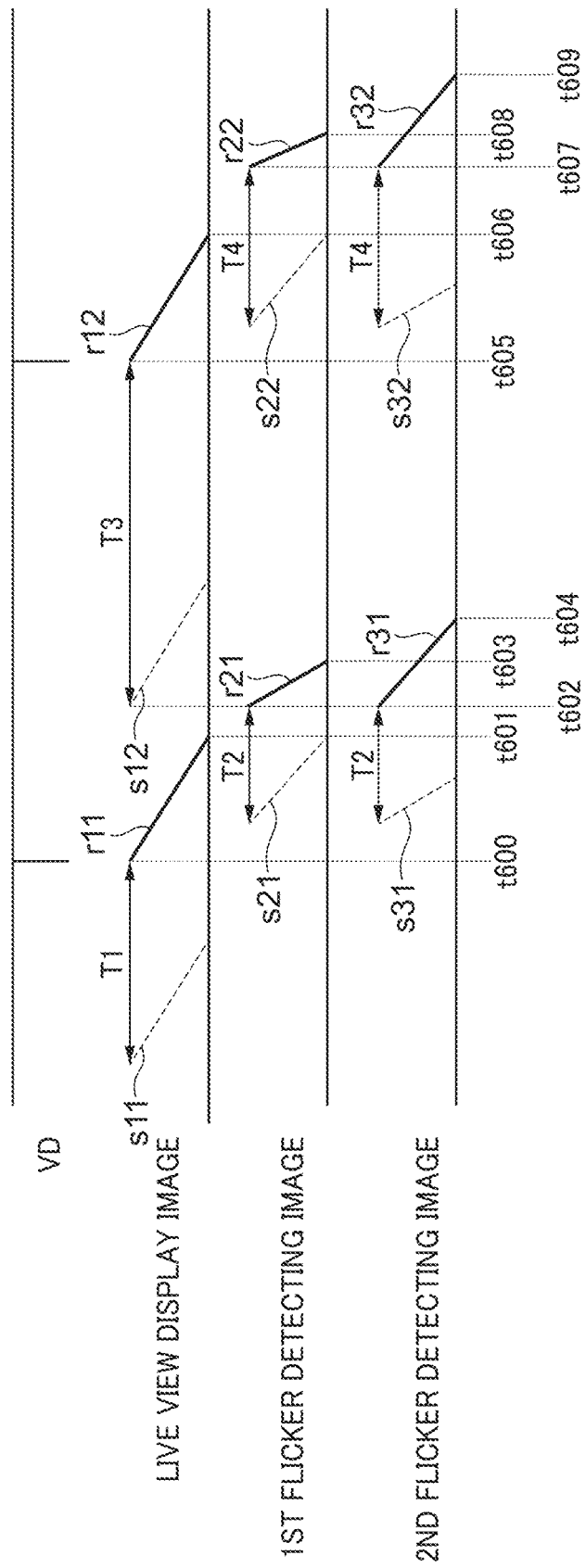
FIG. 6 is a timing diagram showing the operations of capturing the live view image, the first flicker detecting image, and the second flicker detecting image.

FIG. 6 is a timing diagram showing the operations of capturing the live view image, the first flicker detecting image, and the second flicker detecting image. For example, in a case where the image sensor 100 is an image sensor of a rolling shutter type in which reset and readout of pixels are sequentially performed for each row, exposure to each pixel is sequentially performed in a line direction whenever a horizontal synchronization signal (HD) is issued. The timing diagram shown in FIG. 6 shows the operations for sequentially performing reset of pixels, readout of image signals for the live view image in synchronism with a vertical synchronization signal (VD), and readout of image signals for the images for flicker detection in asynchronism with the vertical synchronization signal (VD), on a row-by-row basis.

In FIG. 6, readout scan r11 and readout scan r12 indicate readout scan of the image sensor 100 for the live view image. In a case where the vertical synchronization signal (VD) is asserted for the image sensor 100 at a time t600 and a time t605, as indicated by the readout scan r11 and the readout scan r12, the image sensor 100 starts readout for the live view image, i.e. starts the first readout mode. Then, the readout operations are completed at a time t601 and a time t606, respectively. This live view image is read out by the vertical output lines 300a.

Further, readout scan r21 and readout scan r22 indicate readout scan of the image sensor 100 for the first flicker detecting image. As indicated by the readout scan r21 and the readout scan r22, the image sensor 100 starts readout for the first flicker detecting image, i.e. starts the second readout mode at a time t602 and a time t607. Then, the readout operations are completed at a time t603 and a time t608, respectively. The first flicker detecting image is read out by the vertical output lines 300b.

Further, readout scan r31 and readout scan r32 indicate readout scan of the image sensor 100 for the second flicker detecting image. As indicated by the readout scan r31 and the readout scan r32, the image sensor 100 starts readout for the second flicker detecting image, i.e. starts the third readout mode at the time t602 and the time t607. Then, the readout operations are completed at a time t604 and a time t609, respectively. The second flicker detecting image is read out by the vertical output lines 300c.

At this time, the readout time period of each of the readout scan r31 and the readout scan r32 is longer than the readout time period of each of the readout scan r21 and the readout scan r22. This is because the signal readout time period is changed by controlling the number of vertical pixels of the image sensor 100 from which signals are read out and the number of vertical output lines of the image sensor 100 that read out the signals of these vertical pixels.

Further, to unify the exposure time in each pixel row, reset is also sequentially performed in the line direction similarly to the readout scan. Reset scan s11, reset scan s12, reset scan s21, reset scan s22, reset scan s31, and reset scan s32 each indicate reset scan of the pixels 200 included in the image sensor 100. Thus, in the image sensor 100, readout of signals for the live view image and each flicker detecting image is performed while controlling the readout scan and the reset scan.

At this time, the reset scan s11 of the live view image is controlled such that the accumulation time period of the live view image becomes equal to an accumulation time period T1. The accumulation time period T1 is determined by AE processing performed by the image processor 105. Further, the reset scan s21 for the first flicker detecting image and the reset scan s31 for the second flicker detecting image are controlled such that the accumulation time periods for the first flicker detecting image and the second flicker detecting image each become equal to an accumulation time period T2. At this time, an exposable time of the live view image of the next frame becomes equal to an exposable period T3.

For a frame next to a frame in which the first flicker detecting image is captured in the accumulation time period T2, the reset scan s22 for the first flicker detecting image is controlled such that the accumulation time period for the first flicker detecting image becomes equal to an accumulation time period T4. Similarly, for the frame next to the frame in which the second flicker detecting image is captured in the accumulation time period T2, the reset scan s32 for the second flicker detecting image is controlled such that the accumulation time for the second flicker detecting image becomes equal to the accumulation time period T4.

Here, the accumulation time period T4 will be described. When the first flicker detecting image is captured in the accumulation time period T2, flicker, i.e. stripes are not necessarily produced in the first flicker detecting image. For example, let us consider a case where a light emission period of the flicker light source is 4000 Hz, and the accumulation time period T2 is set to N/4000 seconds (N is a natural number). In this case, the exposure amount becomes an amount corresponding to N light emission periods of the flicker light source in all pixel rows. As a result, the ratio of high and low levels of the luminance of the flicker light source in the exposure time becomes equal between the pixel rows, and hence an influence of the flicker light source, i.e. flicker does not appear in the image.

As described hereinafter, acquisition of the flicker information is based on changes in the luminance value caused by flicker in the image. Therefore, the control of the accumulation time period T4 is required to prevent the accumulation time period T4 from becoming equal to the integer multiple of the period of flicker (stripes), so as to cause the changes in the luminance value due to flicker to appear in the image. To this end, the accumulation time period T4 is so controlled as to prevent the accumulation time period T2 and the accumulation time period T4 from having an integer-multiple relationship. With this, for example, even in a case where flicker is not caused in the image in the accumulation time period T2, it is possible to cause flicker in the image in the accumulation time period T4.

Figure 7A:
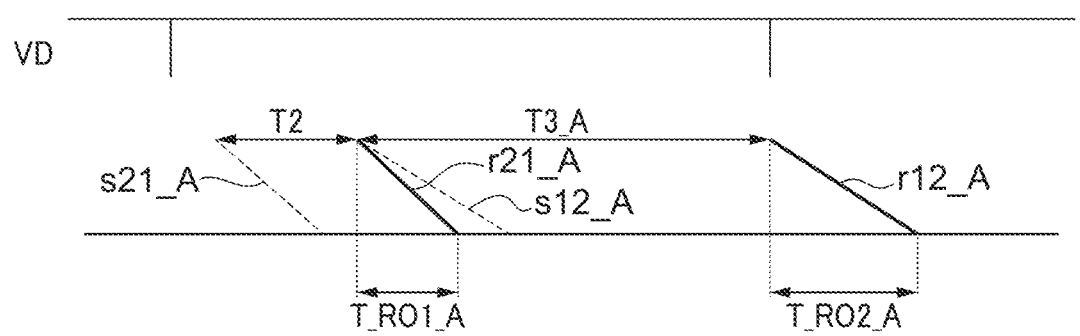
FIG. 7A is a timing diagram showing a relationship between an exposable time of the live view image, a readout time period of the live view image, and a readout time period of the flicker detecting image, in a case where the readout time period for the first flicker detecting image is shorter than the readout time period for the live view image.
Figure 7B:
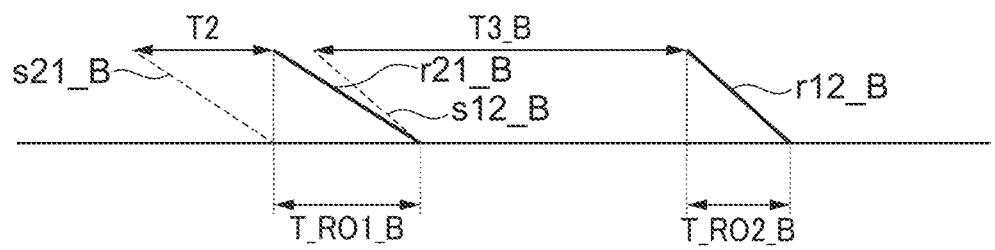
FIG. 7B is a timing diagram showing a relationship between an exposable time of the live view image, a readout time period of the live view image, and a readout time period of the flicker detecting image, in a case where the readout time period for the first flicker detecting image is longer than the readout time period for the live view image.

FIG. 7A is a timing diagram showing a relationship between the exposable time of the live view image, the readout time period of the live view image, and the readout time period of the flicker detecting image. FIG. 7A shows the timing diagram in a case where the readout time period of the first flicker detecting image is shorter than the readout time period of the live view image. FIG. 7B is a timing diagram showing a relationship between the exposable time of the live view image, the readout time period of the live view image, and the readout time period of the flicker detecting image. FIG. 7B shows the timing diagram in a case where the readout time period of the first flicker detecting image is longer than the readout time period of the live view image.

In the case shown in FIG. 7A, a readout time period T_RO1_A of the first flicker detecting image is shorter than a readout time period T_RO2_A of the live view image. At this time, a section between reset scan s21_A and readout scan r21_A is the accumulation time period T2 of the first flicker detecting image. Further, a section between reset scan s12_A and readout scan r12_A is an exposable time T3_A in which exposure can be performed for the live view image. As mentioned above, the live view image shares part of the pixel rows (pixel area) with the first flicker detecting image. Note that these shared pixel rows are the third, fourth, ninth, and tenth rows in the present embodiment (see FIGS. 4A and 4B). With this, exposure for the live view image is started after exposure is terminated for one, for which exposure is started first, of the pixel rows shared by the first flicker detecting image with the live view image.

In the case shown in FIG. 7B, a readout time period T_RO1_B of the first flicker detecting image is longer than a readout time period T_RO2_B of the live view image. At this time, a section between reset scan s21_B and readout scan r21_B is the accumulation time period T2 of the first flicker detecting image. Further, a section between reset scan s12_B and readout scan r12_B is an exposable time T3_B in which exposure can be performed for the live view image. The live view image shares part of the pixel rows with the first flicker detecting image. With this, exposure for the live view image is started earlier by the readout time period T_RO2_B taken to perform the reset scan than a time at which exposure is terminated for one, for which exposure is started last, of the pixel rows shared by the first flicker detecting image with the live view image. Thus, the period in which accumulation of the live view image can be performed in a frame next to the frame in which flicker detection is performed is determined depending on presence/absence of a pixel row shared with the flicker detecting image and a relationship in the readout time period.

Figure 8A:
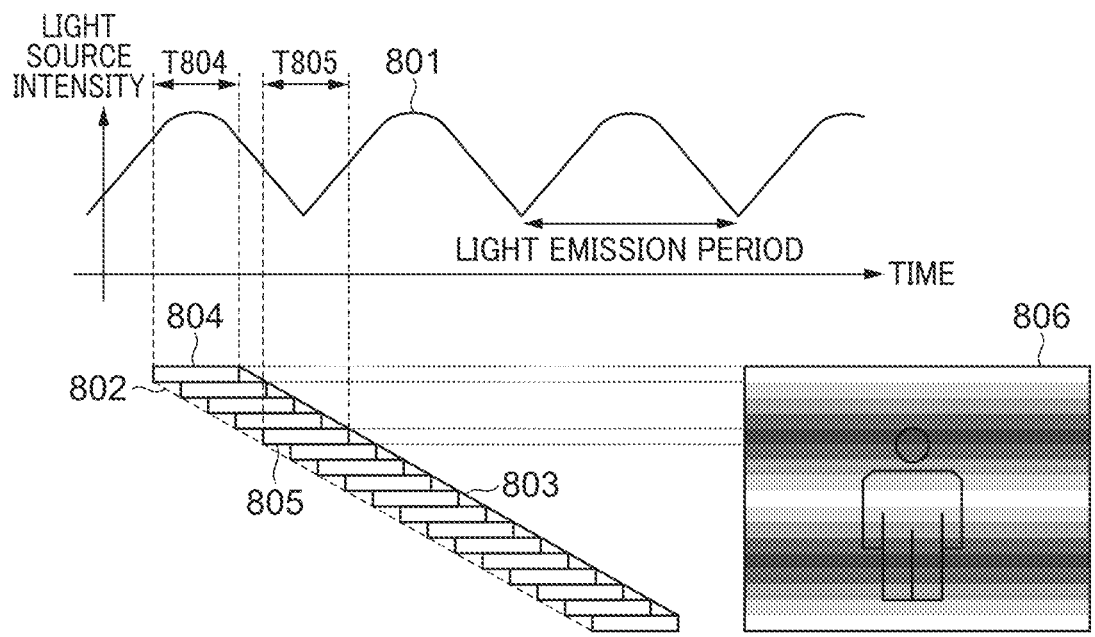
FIG. 8A is a diagram useful in explaining a phenomenon that flicker is caused in an image when image capturing is performed under an environment where the light intensity of a flicker light source periodically changes.

FIG. 8A is a diagram useful in explaining a phenomenon that flicker is caused in an image when image capturing is performed under an environment where the light intensity of a flicker light source periodically changes. As shown in FIG. 8A, light source intensity 801 of the flicker light source periodically changes with time. Further, a section between reset scan 802 and readout scan 803 is an accumulation time. An accumulation time period T804 of a pixel row 804 of the image sensor 100 is more included in a time zone in which the luminance of the flicker light source is high than in a time zone in which the luminance is low. On the other hand, an accumulation time period T805 of a pixel row 805 of the image sensor 100 is more included in a time zone in which the luminance of the flicker light source is low than in a time zone in which the luminance is high. In image capturing under such an environment that the light source intensity 801 periodically changes with time, the exposure amount in each pixel row changes. As a result, in an image 806, a periodic change in the signal level, i.e. flicker is caused.

FIG. 8B is a diagram schematically showing average values of luminance values of pixels included in pixel rows for the flicker detecting image. As shown in FIG. 8B, an image 807 is in a state changing in the luminance value of the flicker detecting image short in time for reading out signals from the image sensor 100. Note that although there is a case where the number of vertical pixels of the image to be read out is actually different, to compare the period of stripes (flicker) caused by the flicker light source in the same angle of view, the description is given assuming that the image 807 and an image 808 have the same size. As mentioned above, the exposure amount changes between pixel rows. As a result, periodic changes in the luminance value, depending on the light emission period of the flicker light source, are caused in the image signals. Therefore, the average value of the luminance values of each pixel row changes as shown in curves 809 and 810 in the image 807 and the image 808, respectively. In the image capturing apparatus 190, the flicker information is acquired by using two flicker detecting images which are different in changes of the luminance as described above.

Figure 9:
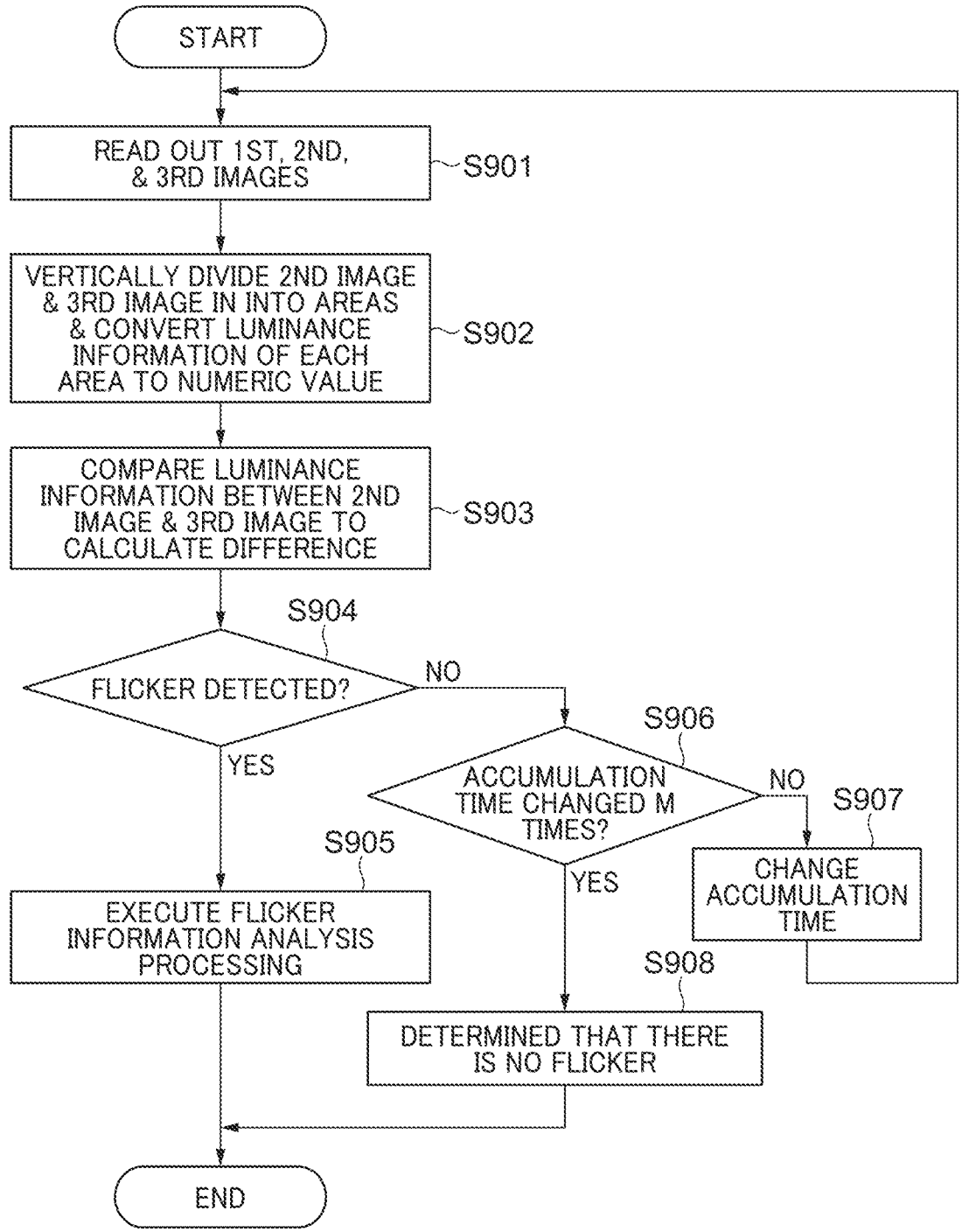
FIG. 9 is a flowchart of a flicker information acquisition process.

Next, a flicker information acquisition process and the resulting actions and effects will be described. FIG. 9 is a flowchart of the flicker information acquisition process. As shown in FIG. 9, in a step S901, the controller 101 controls the image sensor 100 to capture the live view image as the first image. Further, the controller 101 controls the image sensor 100 to capture the first flicker detecting image as the second image and the second flicker detecting image as the third image.

In a step S902, the controller 101 controls the flicker detection unit 102 to divide the first flicker detecting image (second image) and the second flicker detecting image (third image) into areas in the vertical direction and calculate the average value of the luminance information on a divided area basis. Thus, in the image capturing apparatus 190, the luminance of the first flicker detecting image and the luminance of the second flicker detecting image are obtained. Note that in a case where the number of vertical pixels is different between the two flicker detecting images, the controller 101 controls the image processor 105 to perform resizing. With this, the live view image and the flicker detecting images are adjusted to the same size. After that, the flicker detection unit 102 calculates the average value of the luminance information for each area.

In a step S903, the controller 101 controls the flicker detection unit 102 to calculate a difference in luminance between the flicker detecting images by performing subtraction processing using the average values of the luminance information, which are calculated in the step S902 for each area in the vertical direction of the two flicker detecting images. The differences obtained by the subtraction processing forms the flicker information. Then, based on the differences, it is possible to eliminate image information of components not dependent on the flicker light source, i.e. noise, from the image signals, and as a result, it is possible to extract periodic changes of the luminance value dependent on the light emission period of the flicker light source and convert the extracted changes to numeric values for each divided area. Note that although extraction of changes in the luminance value, caused by the flicker light source, is performed by subtraction processing in the present embodiment, this is not limitative, but for example, any other comparison operation method can be used.

In a step S904, the controller 101 controls the flicker detection unit 102 to determine whether or not flicker has been detected. For example, in the step S904, the flicker detection unit 102 adds up a difference absolute value of the luminance value of each divided area, which is obtained for each divided area and converted to a numeric value in the step S903. Then, the flicker detection unit 102 calculates a level of changes in luminance with respect to the whole image by averaging the sum of the difference absolute values by the number of the divided areas. After that, the controller 101 determines whether or not flicker has been detected, by comparing the calculated level and a detection threshold value. Thus, in the present embodiment, the controller 101 also functions as a determination unit configured to determine presence/absence of flicker based on the differences obtained by the flicker detection unit 102.

Note that separately from the controller 101, a unit which functions as the determination unit can be provided. Further, here, in a case where the level of changes in luminance with respect to the whole image is larger than the detection threshold value, the controller 101 determines that flicker is present, by way of example, and the process proceeds to a step S905. On the other hand, if the level of changes in luminance with respect to the whole image is smaller than the detection threshold value, the controller 101 determines that there is no flicker, and the process proceeds to a step S906.

In the step S905, the controller 101 calculates the frequency of flicker based on a result of analysis of the frequency of changes of the luminance value in the image, caused by the flicker light source, and the readout time periods of the two flicker detecting images. In the present embodiment, the controller 101 performs the frequency analysis using Fourier transformation and calculates the frequency (number) of stripes of the two flicker detecting images, caused by flicker. More specifically, the controller 101 calculates the spectrum of the stripes in the image in a frequency domain by applying Fourier transformation to a result of the comparison operation which is obtained in the step S903.

This spectrum is obtained as information on the number of stripes in the vertical direction of the image. In the obtained spectrum, there are two peaks, and one of these two peaks is the frequency (number) of stripes caused by flicker in the first flicker detecting image, and the other is the frequency (number) of stripes caused by flicker in the second flicker detecting image. As mentioned above, the period of stripes caused by flicker in the image depends on the readout time period. Therefore, it is possible to predict the light emission period of the flicker light source by using the information on the number of stripes, which is obtained in the step S905, and the information on the readout time period. For example, by analyzing the number of stripes in the step S905, it is possible to identify that the frequencies (numbers) of stripes caused by flicker in the two flicker detecting images are four and sixteen, respectively.

Let it be assumed that the readout time period of the first flicker detecting image is 1 ms, and the readout time period of the second flicker detecting image is 4 ms. At this time, the number of stripes in the image is proportional to the readout time period, and hence it is found that four stripes appear on the first flicker detecting image, and sixteen stripes appear on the second flicker detecting image, due to flicker. Further, it is possible to calculate the period [s] of the flicker light source, by using the equation of the readout time period [s]: the number of stripes. In the case of the first flicker detecting image, the period of the flicker light source can be calculated as 0.001 [s]÷4=¹⁄₄₀₀₀ [s], and the frequency of the flicker light source can be calculated as 4000 Hz. Note that here, although the frequency of the flicker light source is calculated based on the readout time period and the number of stripes of the first flicker detecting image, this is not limitative, but for example, the frequency of the flicker light source can be calculated based on the readout time period and the number of stripes of the second flicker detecting image.

In the step S906 after execution of the step S904, the controller 101 determines presence/absence of flicker based on the number of times of repetition of the series of processing operations in the steps S901 to S904 after the flicker information calculation process has been started. In the present embodiment, after the readout of the two flicker detecting images has been performed in the accumulation time period T2, the accumulation time is changed, and readout of the live view image and readout of the flicker detecting images are also performed in the accumulation time period T4 (see FIGS. 5A and 5B). Thus, in the present embodiment, whenever the second readout mode and the third readout mode are performed a plurality of times, the accumulation time of the second readout mode and the accumulation time of the third readout mode are changed.

Further, the controller 101 also has a function of a time changing unit configured to change this accumulation time. Then, in a case where the accumulation time has been changed once after flicker information calculation has been started, the controller 101 proceeds to a step S908 and determines that there is no flicker, followed by terminating the present process. Further, in a case where the number of times of changing the accumulation time is smaller than one, the process proceeds to a step S907, wherein the controller 101 changes the accumulation time from T2 to T4, and the process returns to the step S901 to execute the step S901 et seq. Note that separately from the controller 101, a unit which functions as the time changing unit can be provided.

As described above, the image capturing apparatus 190 acquires the second image and the third image while changing the accumulation time. Further, in the present embodiment, by setting the accumulation time to an accumulation time shorter than the shortest period of a detection target, it is possible to cause stripes caused by flicker to appear in the image. In this case, flicker can be detected by one frame, and change of the accumulation time is not required, and hence the process can be terminated by omitting the step S906.

Further, in the present embodiment, in a case where it is determined in the step S904 that there is no flicker, and it is determined in the step S906 that the number of times of changing the accumulation time is smaller than one, the accumulation time is changed. On the other hand, regardless of presence/absence of flicker, the accumulation time can be changed immediately after the start of flicker information calculation, and the plurality of first flicker detecting images and the plurality of second flicker detecting images can be acquired. With this, under a condition that flicker with a variety of frequencies is present, the image capturing apparatus 190 can perform image capturing such that changes in the luminance value, caused by flicker, appear in the image, without waiting until presence/absence of flicker is determined.

Further, the controller 101 can control the accumulation time to the integer multiple of the period of flicker light source based on the frequency of the flicker light source, which is calculated by the flicker information acquisition process in FIG. 9. With this, it is possible to capture a still image in which the influence of the flicker light source is reduced.

As described above, the image capturing apparatus 190 reads out the live view image in the first readout mode. Further, the image capturing apparatus 190 reads out the first flicker detecting image in the second readout mode during operation of the first readout mode, and reads out the second flicker detecting image in the third readout mode at a timing different from the readout timing of the second readout mode. Then, the flicker detection unit 102 can acquire the flicker information based on the first flicker detecting image and the second flicker detecting image. With this, it is possible to detect flicker in a wider range of frequencies, without affecting the exposure condition for capturing the live view image, i.e. while preventing the image capturing condition, such as the exposure time, for example, from being affected, during capturing of the live view image. This makes it possible to perform image capturing in a state less affected by the flicker light source.

A second embodiment of the present disclosure will be described below with reference to FIGS. 10 to 12, but the description is given mainly of different points from the above-described embodiment, and the description of the same points is omitted.

Figure 10:
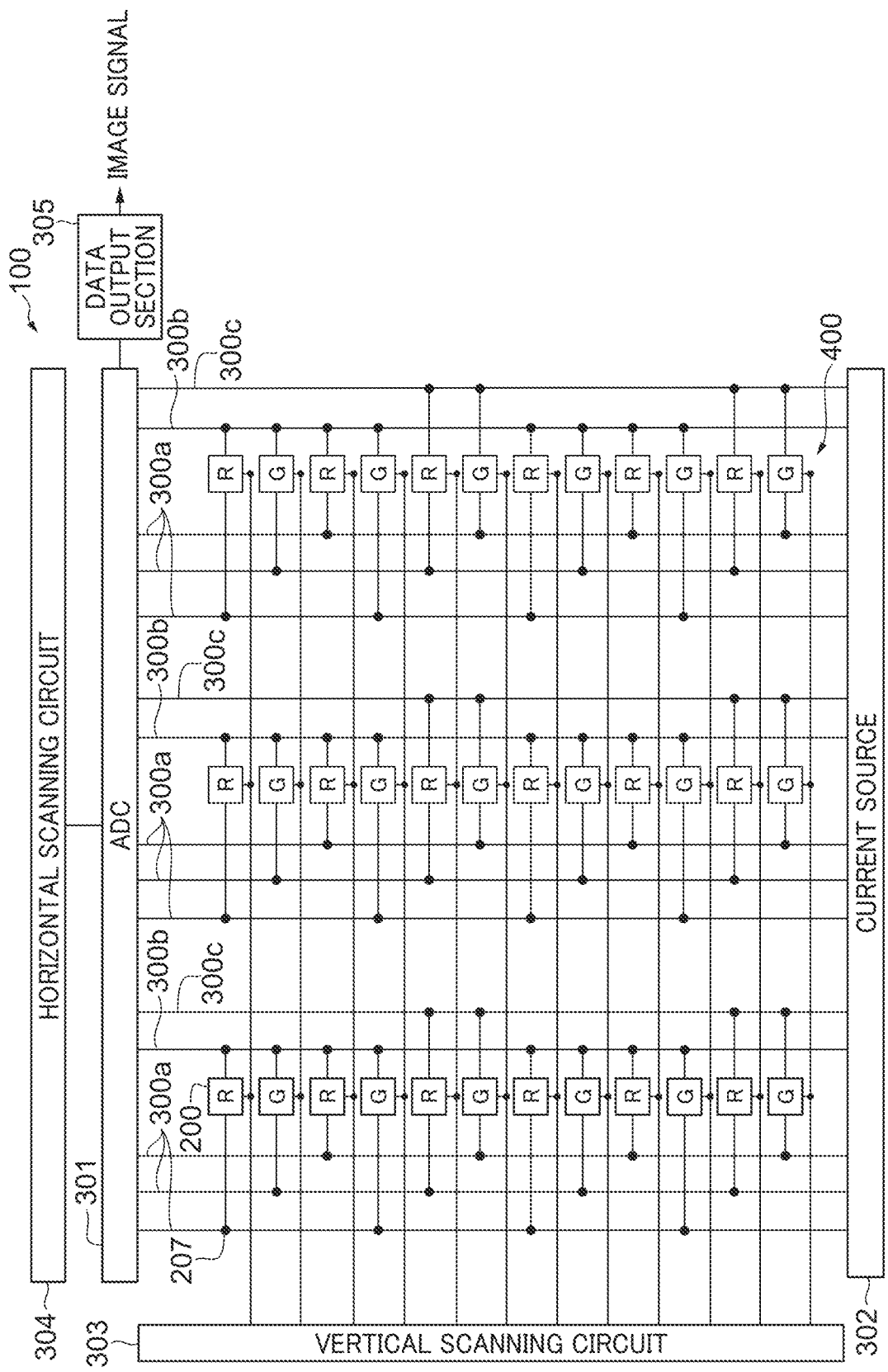
FIG. 10 is a diagram showing a circuit configuration of the image sensor according to a second embodiment.

FIG. 10 is a diagram showing a circuit configuration of the image sensor according to the second embodiment. As shown in FIG. 10, the pixel area (pixels 200) read out by the vertical output line 300b and the pixel area (pixels 200) read out by the vertical output lines 300a are shared. Also, the pixel area (pixels 200) read out by the vertical output line 300c and the pixel area read out by the vertical output lines 300a are shared. Further, the pixel area read out by the vertical output line 300b and the pixel area read out by the vertical output line 300c are different from each other. With such a sharing/non-sharing state, accumulation of the second image and readout of image signals of the second image can be performed independently of accumulation of the third image and readout of image signals of the third image.

Further, in the present embodiment, although the number of vertical output lines 300a for each column of pixels for reading out signals for the live view image is three, the number of vertical output lines 300b for the column of pixels for reading out signals for the first flicker detecting image and the number of vertical output lines 300c for the column of pixels for reading out signals for the second flicker detecting image are one, respectively. That is, the number of vertical output lines for each column of pixels for reading out signals for the live view image is different from the number of vertical output lines for the column of pixels for reading out signals for the first flicker detecting image and the number of vertical output lines for the column of pixels for reading out signals for the second flicker detecting image. Further, the number of vertical output lines for the column of pixels for reading out signals for the first flicker detecting image and the number of vertical output lines for the column of pixels for reading out signals for the second flicker detecting image are the same as each other.

Figure 11C:
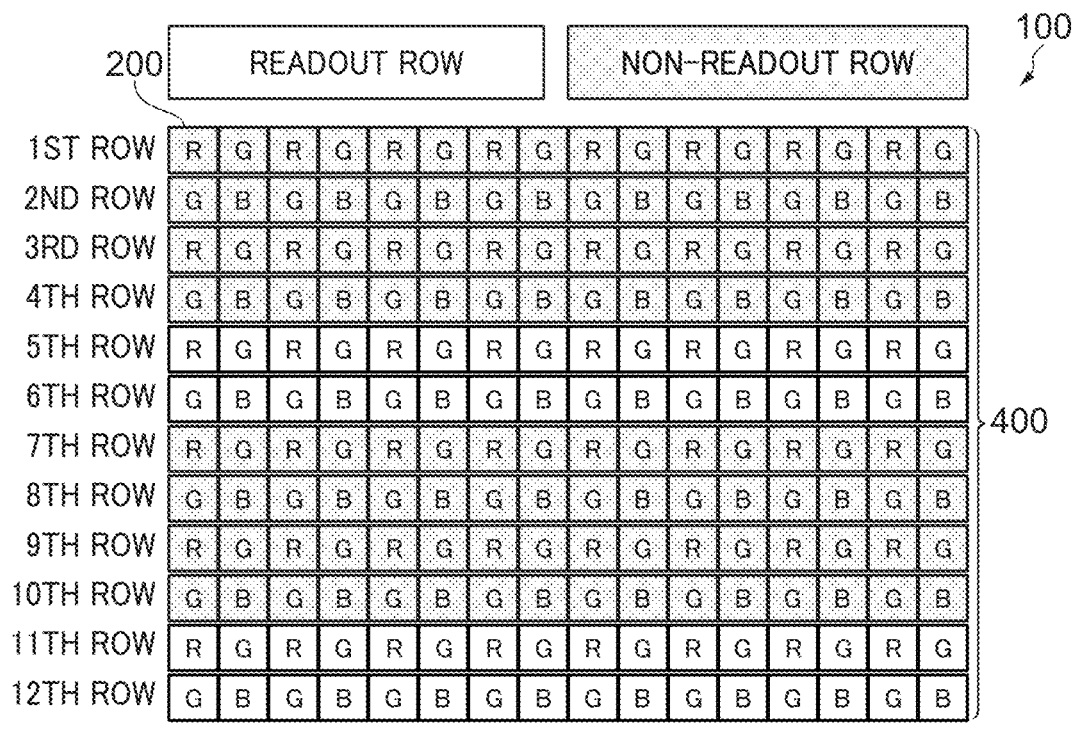

Next, readout of the first image, the second image, and the third image in the present embodiment will be described with reference to FIGS. 11A to 11C. FIG. 11A is a diagram showing how signals are read out from the image sensor for the live view image (first image). FIG. 11B is a diagram showing how signals are read out from the image sensor for the first flicker detecting image (second image). FIG. 11C is a diagram showing how signals are read out from the image sensor for the second flicker detecting image (third image).

In the first readout mode, with respect to the R-G rows including the pixels 200 on which the color filters R and G are disposed and the G-B rows including the pixels 200 on which the color filters G and B are disposed, signals are read out from all rows out of the six rows in the six-row period. The pixel rows from which the signals are read out in the illustrated example in FIG. 11A (the live view image) are the first to twelfth rows.

In the second readout mode, signals are read out from four rows out of the six rows in the six-row period. The pixel rows from which the signals are read out in the illustrated example in FIG. 11B (the first flicker detecting image) are the first to fourth rows and the seventh to twelfth rows. In the third readout mode, signals of two rows out of the six rows in the six-row period are read out. The pixel rows from which the signals are read out in the illustrated example in FIG. 11C (the second flicker detecting image) are the fifth and sixth rows, and the eleventh and twelfth rows, different from the pixel rows from which signals are read out for the first flicker detecting image.

Thus, in the present embodiment, the total number of pixel rows from which signals are read out in the second readout mode is larger than the total number of pixel rows from which signals are read out in the third readout mode. That is, the total number of the pixel rows from which signals are read out in the second readout mode and the total number of the pixel rows from which signals are read out in the third readout mode are different from each other.

As described above, in the present embodiment, both of the second readout mode and the third readout mode share the pixel rows (pixel array) with the first readout mode. That is, the second readout mode and the first readout mode share the first to fourth rows and the seventh to twelfth rows. Further, the third readout mode and the first readout mode share the fifth, sixth, eleventh, and twelfth rows.

Although in the present embodiment, both of the second readout mode and the third readout mode share the pixel array with the first readout mode, this is not limitative, but it is only required that at least one of the readout modes shares the pixel array with the first readout mode. Further, the pixel rows from which the signals are read out in the second readout mode are the first to fourth rows and the seventh to twelfth rows, and the pixel rows from which the signals are read out in the third readout mode are the fifth and sixth rows, and the eleventh and twelfth rows. As a result, the second readout mode and the third readout mode do not share pixel rows with each other. With such a sharing/non-sharing state, out of the pixels 200 included in the image sensor 100, all of the pixels 200 used for image capturing can be allocated to the live view image. With this, it is possible to obtain an image while preventing lowering of the resolution when flicker detection is performed.

As described above, the readout time period can be expressed by the above equation (1). Then, in the present embodiment, a ratio of the readout time periods of the two flicker detecting images is expressed by the following equation (4):

$$T\_RO2 : T\_RO3 = 1 \times 4 \div 1 : 1 \times 2 \div 1 = 2 : 1 \qquad (4)$$

Note that although signals are read out for the two flicker detecting images from the four pixels rows and the two pixel rows out of the six rows in the six-row period, respectively, which are different from each other, this is not limitative, but the number of pixel rows can be changed, or the same pixel rows can be used. Further, although in the present embodiment, the different vertical output lines are used to read out the two flicker detecting images, and the number of the used vertical output line for each column of pixels is set to one for both the images, this is not limitative, but for example, the signals for the two images can be read out by the same vertical output lines.

Figure 12:
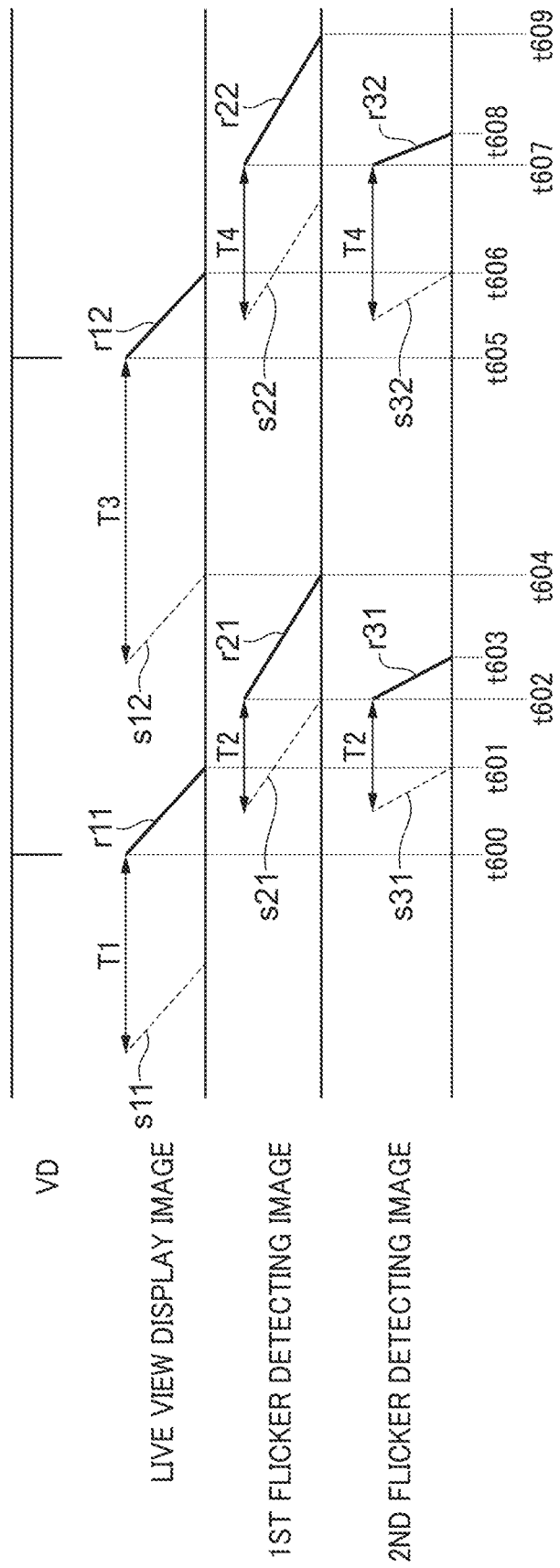
FIG. 12 is a timing diagram showing the operations of capturing the live view image, the first flicker detecting image, and the second flicker detecting image.

FIG. 12 is a timing diagram showing the operations of capturing the live view image, the first flicker detecting image, and the second flicker detecting image. As described above, the two flicker detecting images share the pixel area (pixel rows) with the live view image. Further, the readout time period of the first flicker detecting image is longer than the readout time period of the live view image. Here, let us consider a time at which exposure can be started with respect to the pixel area for the live view image in a frame next to the frame in which flicker detection is performed. The time is earlier than the time t604 at which exposure is terminated for one of the pixel rows shared by the first flicker detecting image with the live view image, for which exposure is started last, by a time period taken to perform the reset scan for the live view image, as described in the first embodiment.

As shown in FIG. 12, the readout time period of the second flicker detecting image is shorter than the readout time period of the first flicker detecting image. Further, the two flicker detecting images start reset scan and readout scan at the same time. With this, the time at which exposure can be started with respect to a pixel area for the live view image in the frame next to the frame in which flicker detection is performed is determined by the time t604 at which exposure is terminated for one of the pixel rows shared by the first flicker detecting image with the live view image, for which exposure is started last. Note that although in the present embodiment, reset scan and readout scan are started at the same time for the two flicker detecting images, this is not limitative. For example, the centroids of exposure can be aligned between the live view image and each flicker detecting image to more enhance the simultaneity. This improves the performance of flicker detection in a case where the object is a moving body.

A third embodiment of the present disclosure will be described below with reference to FIGS. 13 to 17, but the description is given mainly of different points from the above-described embodiments, and the description of the same points is omitted.

Figure 13:
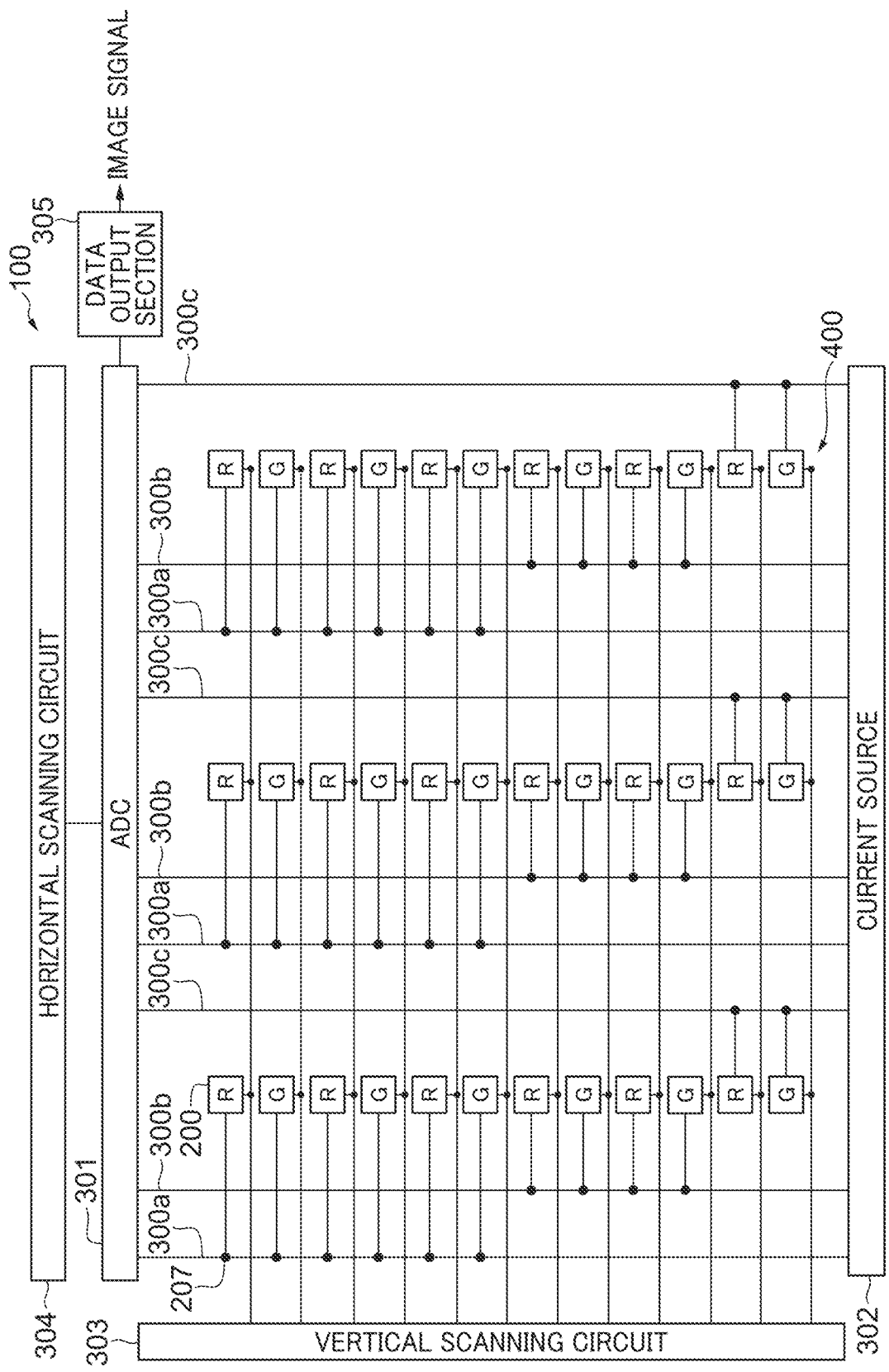
FIG. 13 is a diagram showing a circuit configuration of the image sensor according to a third embodiment.

FIG. 13 is a diagram showing a circuit configuration of the image sensor according to the third embodiment. As shown in FIG. 13, the pixel areas (pixels 200) from which signals are read out by the vertical output lines 300a, the vertical output lines 300b, and the vertical output lines 300c are different areas and are not shared with one another. This makes it possible to perform accumulation of the first image and readout of image signals of the first image, accumulation of the second image and readout of image signals of the second image, and accumulation of the third image and readout of image signals of the third image, independently of one another.

Figures 14A, 14B:
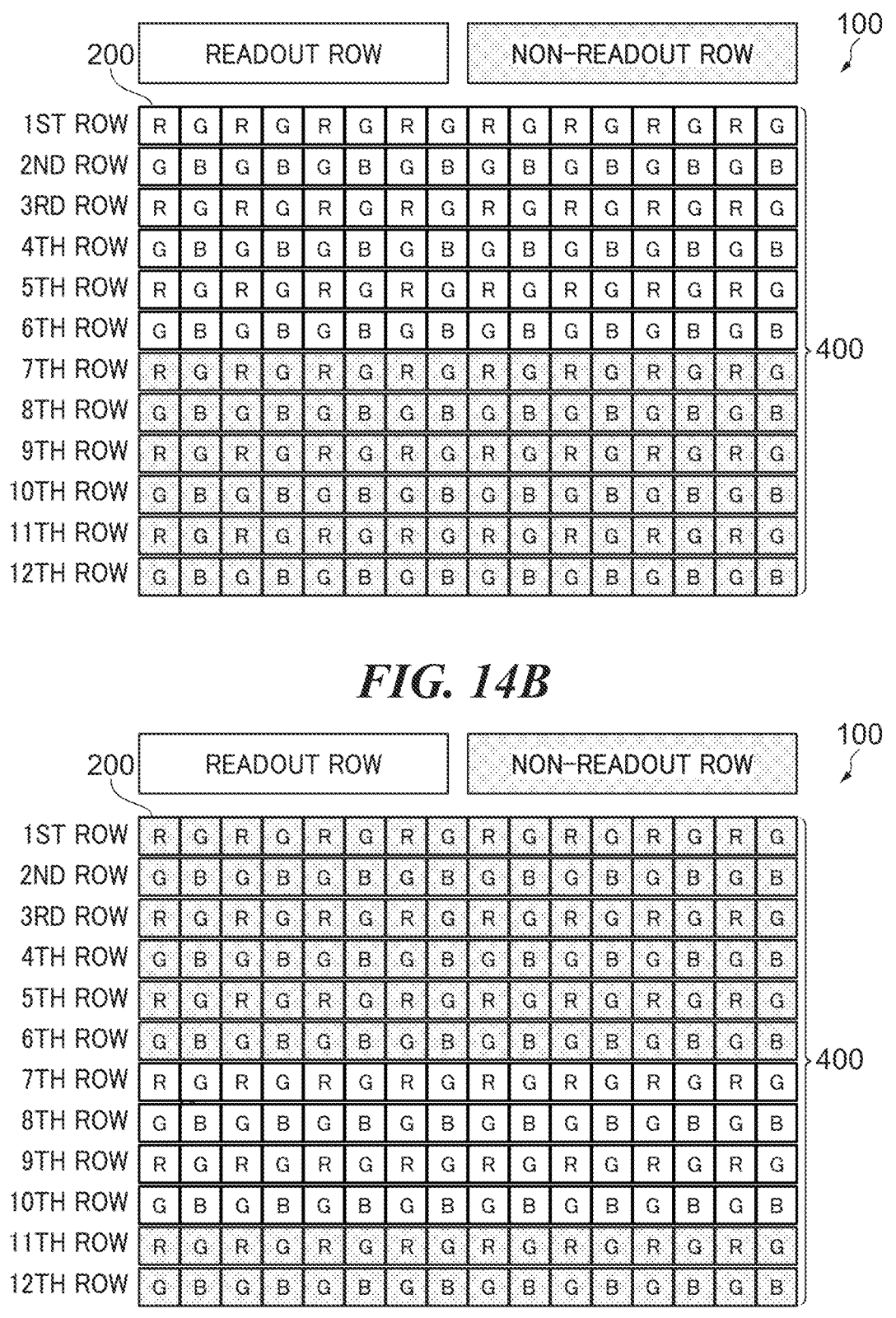
Figure 14C:
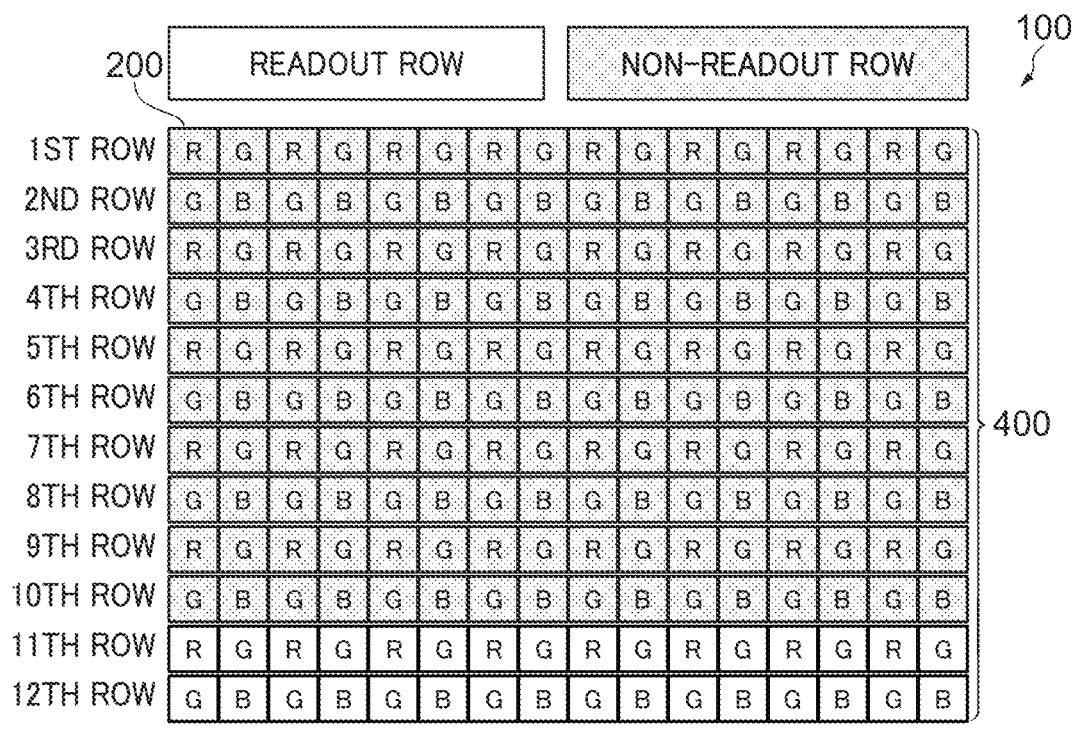

Next, the readout time periods of the first image, the second image, and the third image in the present embodiment will be described with reference to FIGS. 14A to 14C. FIG. 14A is a diagram showing how signals are read out from the image sensor for the live view image (first image). FIG. 14B is a diagram showing how signals are read out from the image sensor for the first flicker detecting image (second image). FIG. 14C is a diagram showing how signals are read out from the image sensor for the second flicker detecting image (third image).

In the first readout mode, with respect to the R-G rows including the pixels 200 on which the color filters R and G are disposed and the G-B rows including the pixels 200 on which the color filters G and B are disposed, signals are read out from six rows out of 12 rows in a 12-row period (period of repetition of 12 rows). The pixel rows from which signals are read out in the illustrated example in FIG. 14A (live view image) are the first to sixth rows.

In the second readout mode, signals are read out from four rows out of the 12 rows in the 12-row period. The pixel rows from which signals are read out in the illustrated example in FIG. 14B (the first flicker detecting image) are the seventh to tenth rows. In the third readout mode, signals are read out from two rows out of the 12 rows in the 12-row period. The pixel rows from which signals are read out in the illustrated example in FIG. 14C (the second flicker detecting image) are the eleventh and twelfth rows.

As described above, in the present embodiment, the second readout mode and the third readout mode do not share pixel rows (array) with the first readout mode. Further, the second readout mode and the third readout mode do not share pixel rows with each other, either.

As described above, the readout time period can be expressed by the above equation (1). Further, in the present embodiment, the ratio of the readout time periods of the two flicker detecting images is expressed by the following equation (5):

$$T\_RO2 : T\_RO3 = 1 \times 4 \div 1 : 1 \times 2 \div 1 = 2 : 1 \qquad (5)$$

Note that although in the present embodiment, readout of signals for the two flicker detecting images is performed from the four pixel rows and the two pixel rows, which are different from each other, out of the 12 rows in the 12-row period, respectively, this is not limitative, but for example, the number of pixel rows can be changed or the same pixel rows can be used. Further, although in the present embodiment, the different vertical output lines are used to read out signals for the two flicker detecting images, and the number of vertical output lines is set to one for both images, the number of vertical output lines is not limited to this.

Figure 15:
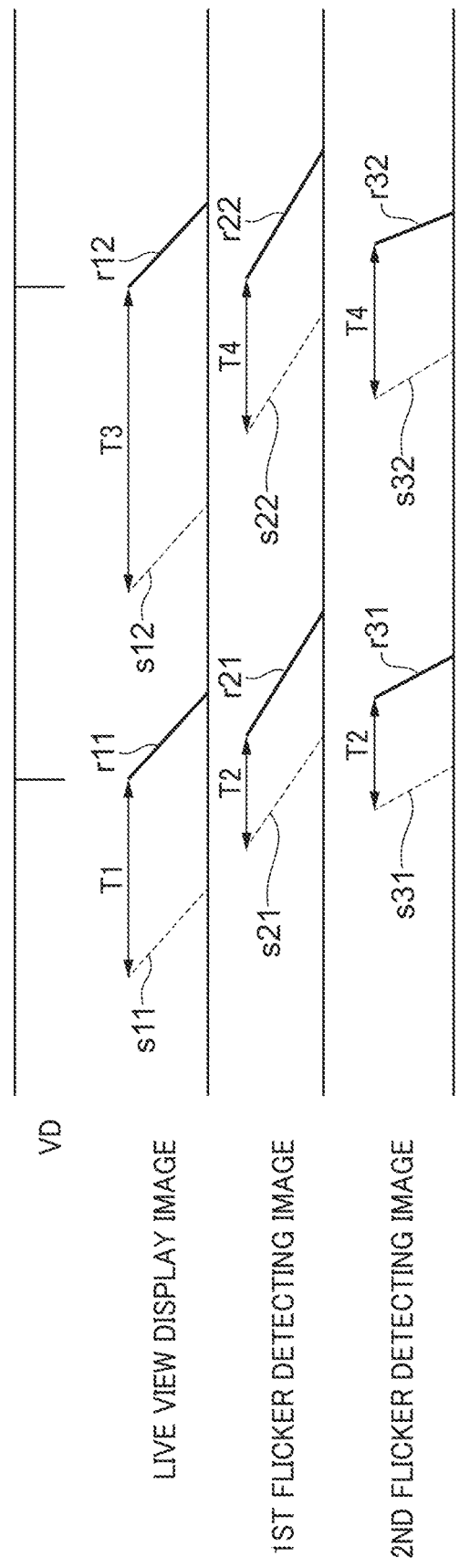
FIG. 15 is a timing diagram showing the operations of capturing the live view image, the first flicker detecting image, and the second flicker detecting image.

FIG. 15 is a timing diagram showing the operations of capturing the live view image, the first flicker detecting image, and the second flicker detecting image. As shown in FIG. 15, the readout scan r11 and the readout scan r12 for the live view image are periodically performed in synchronism with the vertical synchronization signal (VD). The live view image, the first flicker detecting image, and the second flicker detecting image have the respective pixel areas (pixel rows) independent of one another, from which signals are output by the vertical output lines independent of each other. With this, it is possible to set the independent accumulation time and the readout timing with respect to each image.

Note that it is also possible to set the timings of the readout scan r11, the readout scan r21, and the readout scan r31 to the same timing. This makes it possible to set the readout timings of the first flicker detecting image and the second flicker detecting image to the same timing, and as a result, it becomes easy to detect flicker when image capturing is performed for a moving object.

Figure 16:
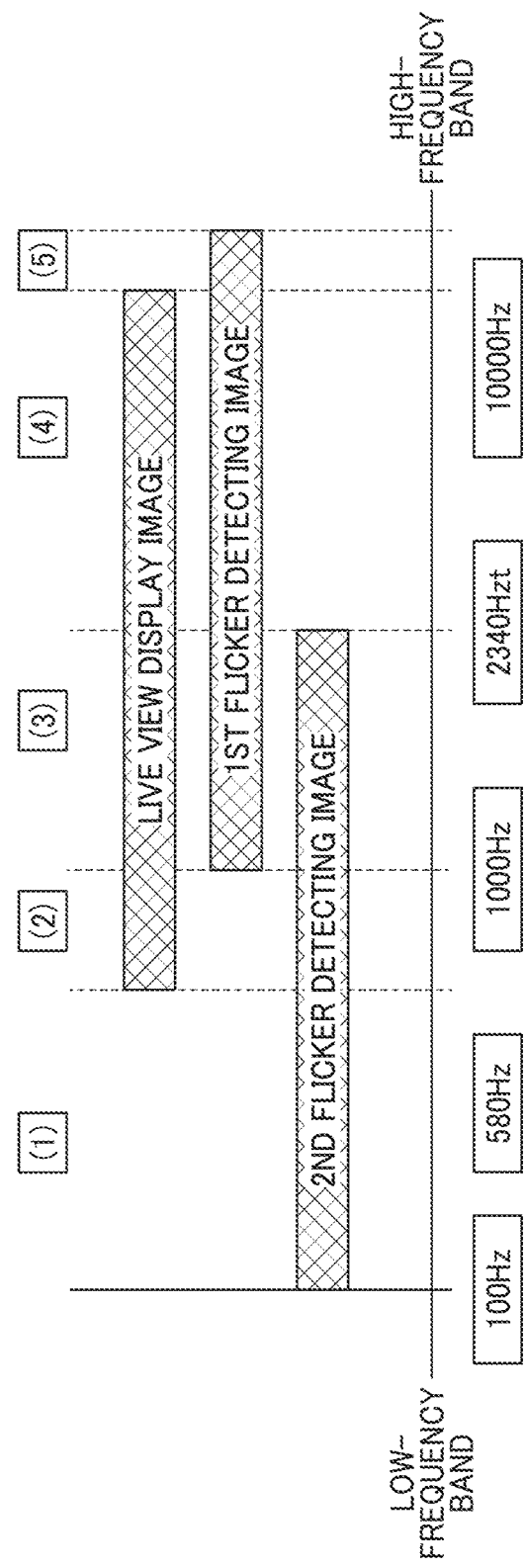
FIG. 16 is a diagram showing differences in detection frequency band, caused by differences in readout time period between the live view image, the first flicker detecting image, and the second flicker detecting image.

FIG. 16 is a diagram showing differences in detection frequency band, resulting from differences in readout time period between the live view image, the first flicker detecting image, and the second flicker detecting image. As described above, the detection frequency band is different due to a difference in readout time period (see FIGS. 8A and 8B). For this reason, as shown in FIG. 16, it is possible to make the detection frequency band wider when flicker is detected from the first flicker detecting image and the second flicker detecting image than when flicker is detected from the live view image and the first flicker detecting image.

However, in a case where the live view image is used as an flicker detecting image, it is necessary to change the exposure time of the live view image to the exposure time for flicker detection. Therefore, there is a fear that screen flicker, for example, is caused in the live view image, which gives a sense of wrongness to the user.

Figure 17:
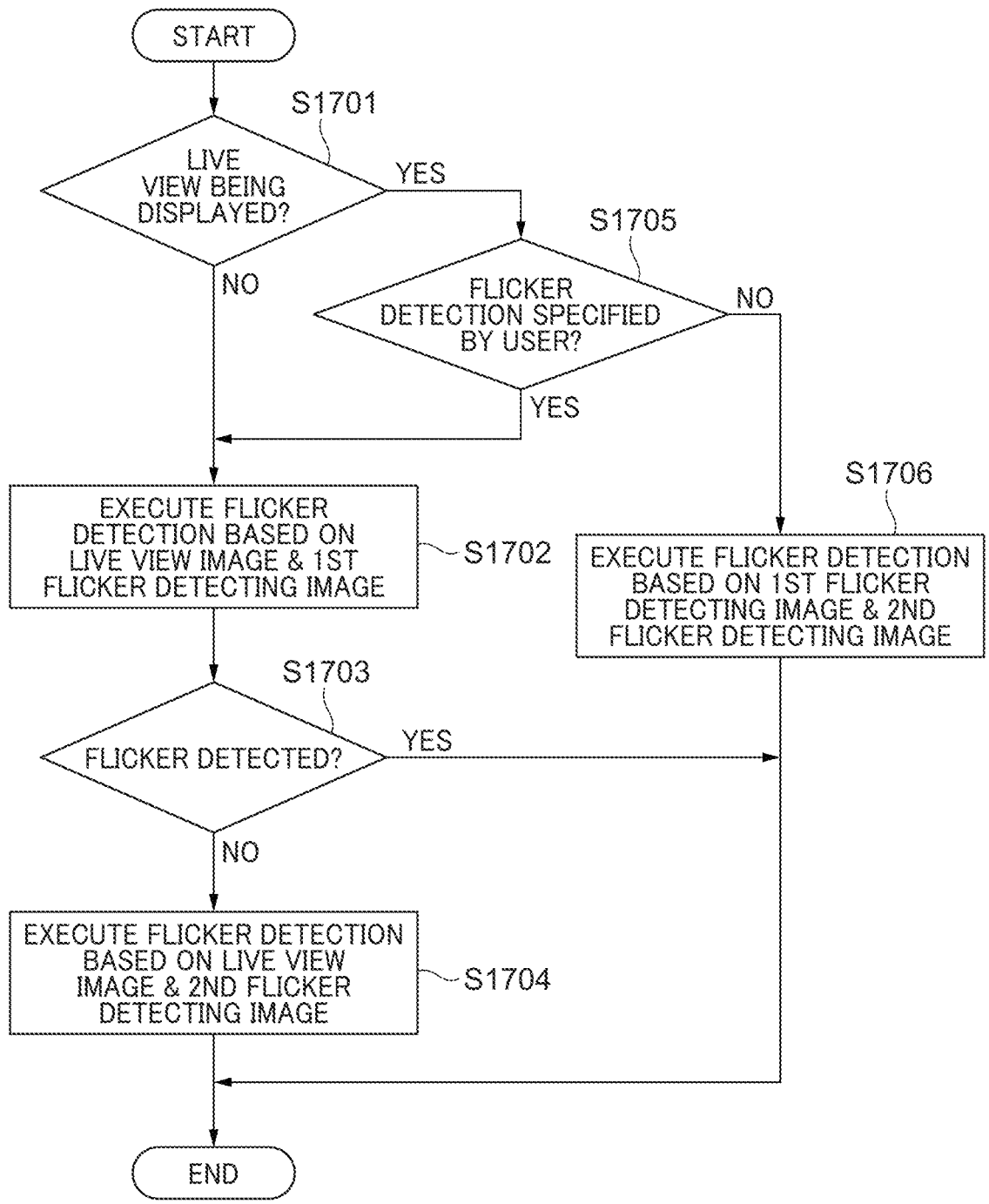
FIG. 17 is a flowchart of a process for switching a combination of images used for flicker detection.

To prevent this, a configuration for switching a combination of images used for flicker detection will be described with reference to FIG. 17. FIG. 17 is a flowchart of the process for switching a combination of images used for flicker detection.

As shown in FIG. 17, in a step S1701, the controller 101 determines whether or not the live view is being displayed. The "state in which the live view is being displayed" refers to a state in which the live view is being displayed on the display unit 104. If it is determined in the step S1701 that the live view is not being displayed, the process proceeds to a step S1702. On the other hand, if it is determined in the step S1701 that the live view is being displayed, the process proceeds to a step S1705.

In the step S1702, the controller 101 controls the flicker detection unit 102 to perform flicker detection based on the live view image and the first flicker detecting image.

In a step S1703, the controller 101 controls the flicker detection unit 102 to determine whether or not flicker has been detected. If it is determined in the step S1703 that there is no flicker, the process proceeds to a step S1704. On the other hand, if it is determined in the step S1703 that flicker is present, the present process is terminated.

In the step S1704, the controller 101 controls the flicker detection unit 102 to perform flicker detection based on the live view image and the second flicker detecting image, followed by terminating the present process.

In the step S1705 after execution of the step S1701, the controller 101 determines whether or not flicker detection is flicker detection specified by the user in advance. The "flicker detection specified by the user in advance" refers to flicker detection specified by the user using the operation unit 103 as desired, and this information is stored in the storage unit. If it is determined in the step S1705 that flicker detection is flicker detection specified by the user, the process proceeds to the step S1702, and the step S1702 et seq. are executed. On the other hand, if it is determined in the step S1705 that flicker detection is not flicker detection specified by the user, the process proceeds to a step S1706.

In the step S1706, the controller 101 controls the flicker detection unit 102 to perform flicker detection based on the first flicker detecting image and the second flicker detecting image, followed by terminating the present process.

As described above, in the present embodiment, it is possible to perform flicker detection (acquisition of flicker information) based on the live view image and the first flicker detecting image and flicker detection based on the live view image and the second flicker detecting image. Needless to say, the flicker detection unit 102 can also perform flicker detection based on the first flicker detecting image and the second flicker detecting image. In the image capturing apparatus 190 configured as described above, it is possible to set the readout timing of the first flicker detecting image and the readout timing of the second flicker detecting image to the same timing. This makes it easy to perform flicker detection when image capturing is performed for a moving object.

A fourth embodiment of the present disclosure will be described below with reference to FIGS. 18 to 20, but the description is given mainly of different points from the above-described embodiments, and the description of the same points is omitted.

Figure 18:
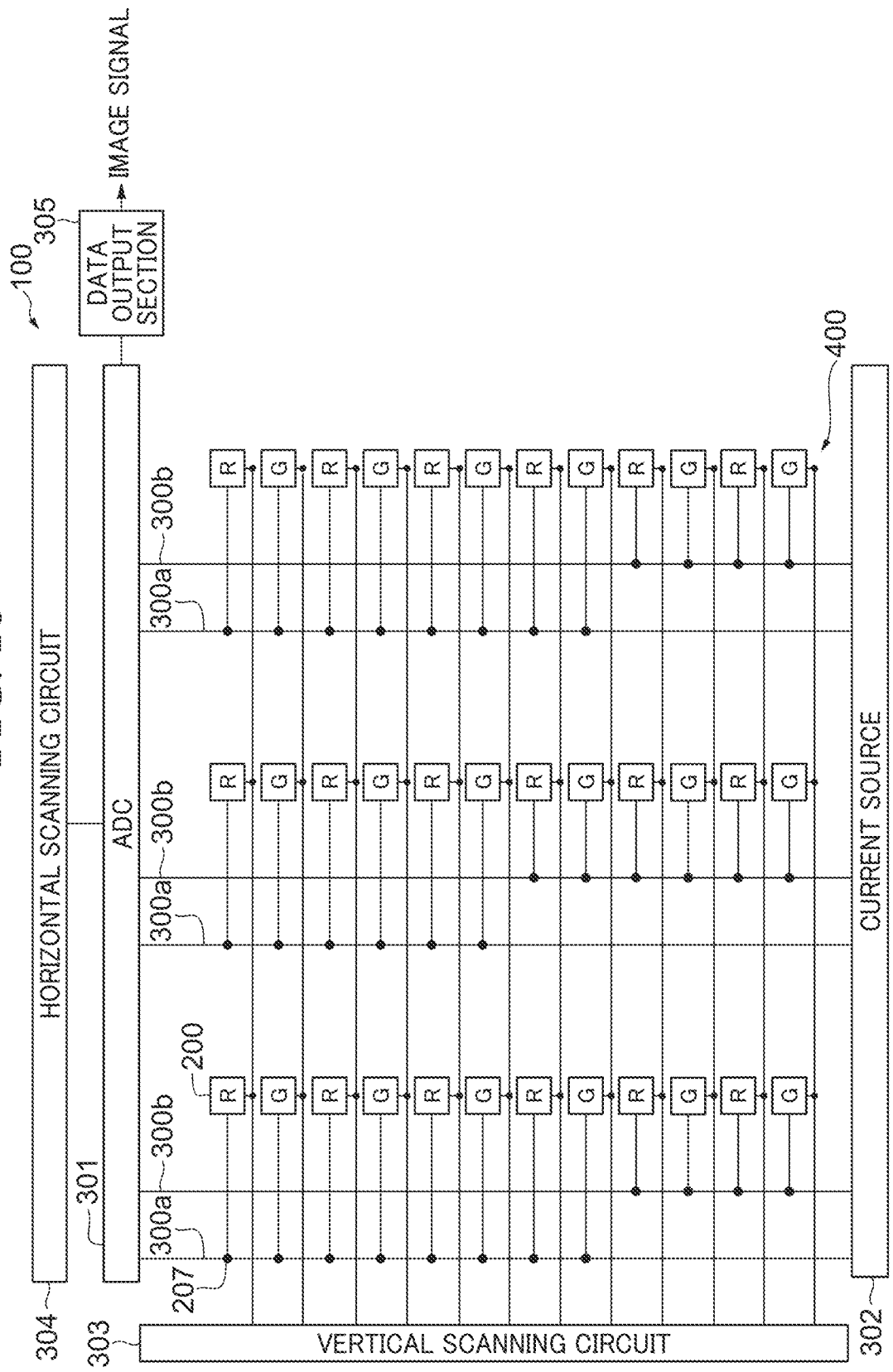
FIG. 18 is a diagram showing a circuit configuration of the image sensor according to a fourth embodiment.

FIG. 18 is a diagram showing a circuit configuration of the image sensor according to the fourth embodiment. In the configuration shown in FIG. 18, signals for the first image are read out by the vertical output lines 300a, and signals for the second image and the third image are read out by the vertical output lines 300b.

Figures 19A, 19B:
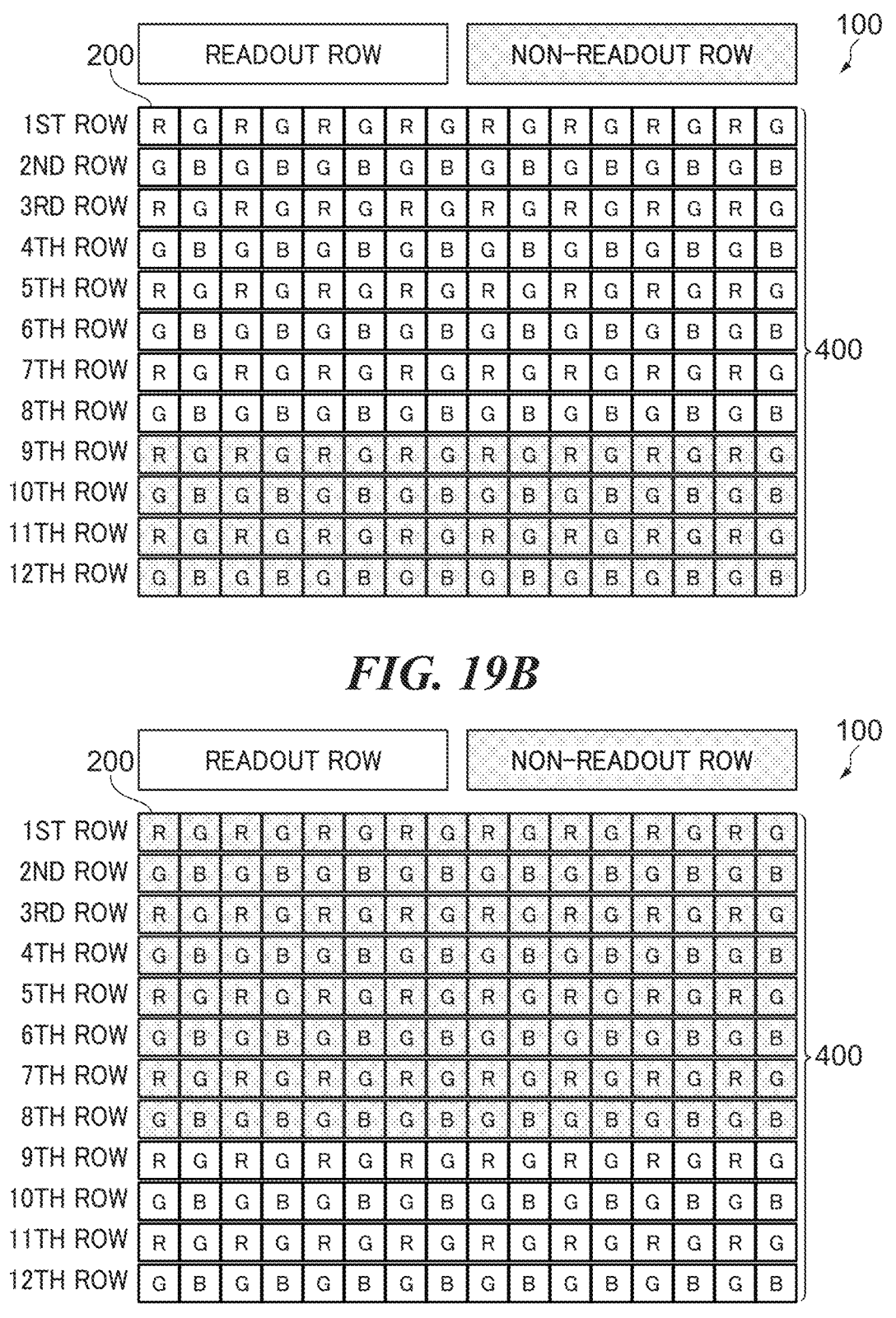
Figure 19C:
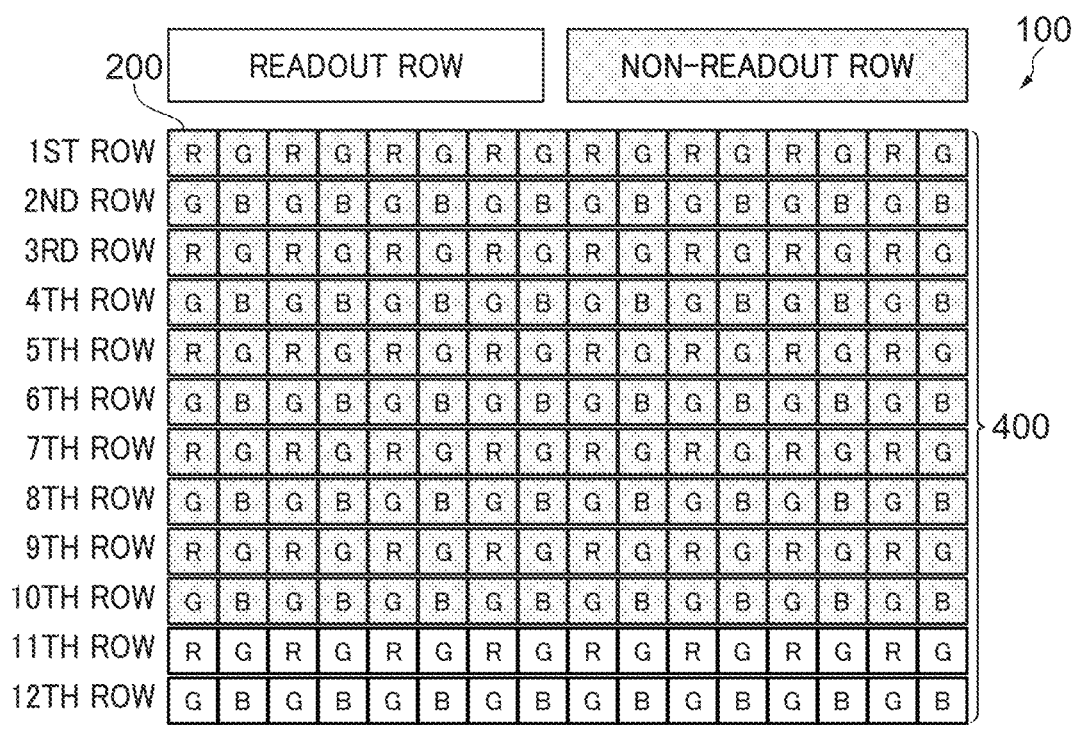

Next, the readout time periods of the first image, the second image, and the third image in the present embodiment will be described with reference to FIGS. 19A to 19C. FIG. 19A is a diagram showing how signals are read out from the image sensor for the live view image (first image). FIG. 19B is a diagram showing how signals are read out from the image sensor for the first flicker detecting image (second image). FIG. 19C is a diagram showing how signals are read out from the image sensor for the second flicker detecting image (third image).

In the first readout mode, with respect to the R-G rows including the pixels 200 on which the color filters R and G are disposed and the G-B rows including the pixels 200 on which the color filters G and B are disposed, signals are read out from eight rows out of the 12 rows in the 12-row period. The pixel rows from which signals are read out in the illustrated example in FIG. 19A (the live view image) are the first to eighth rows.

In the second readout mode, signals are read out from four rows out of the 12 rows in the 12-row period. The pixel rows from which signals are read out in the illustrated example in FIG. 19B (the first flicker detecting image) are the ninth to twelfth rows. In the third readout mode, signals are read out from two rows out of the 12 rows in the 12-row period. The pixel rows from which signals are read out in the illustrated example in FIG. 19C (the second flicker detecting image) are the eleventh and twelfth rows.

As described above, in the present embodiment, the second readout mode and the third readout mode do not share pixel rows (pixel array) with the first readout mode. Further, the second readout mode and the third readout mode share pixel rows with each other.

FIG. 20 is a timing diagram showing the operations of capturing the live view image, the first flicker detecting image, and the second flicker detecting image. As shown in FIG. 20, the readout scan r11 and the readout scan r12 as the readout scan for the live view image are periodically performed in synchronism with the vertical synchronization signal (VD). The first flicker detecting image and the second flicker detecting image do not share pixel area (pixel rows) and vertical output lines with the live view image. With this, it is possible to set the accumulation time and the readout timing with respect to the first flicker detecting image and the second flicker detecting image independently of the live view image.

Note that the first flicker detecting image and the second flicker detecting image share vertical output lines, and hence readout at the same timing is restricted. Further, the first flicker detecting image and the second flicker detecting image share the pixel area. Therefore, it is preferable to perform the reset scan s31 and the reset scan s12 after the first flicker detecting image is read out.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-185559 filed Nov. 21, 2022, which is hereby incorporated by reference herein in its entirety.

What is claimed is:

1. An apparatus comprising:
    an image capturing unit configured to have a pixel area formed by a plurality of pixels arranged in a matrix and a plurality of output lines each of which reads out a signal from the pixel area for each of rows of the pixels, and obtain a captured image by performing image capturing; and
    a flicker information acquisition unit configured to acquire flicker information on flicker of the captured image caused by a light source,
    wherein the image capturing unit is capable of operating:
    in a first readout mode in which signals of a first image formed by the captured image are each read out on a row-by-row basis,
    in a second readout mode in which signals of a second image formed by part of the captured image are each read out on a row-by-row basis, during operation in the first readout mode, and
    in a third readout mode in which signals of a third image formed by part of the captured image are each read out on a row-by-row basis, in a timing different from a timing of the second readout mode, during operation in the first readout mode,
    wherein the flicker information acquisition unit can acquire the flicker information based on the second image and the third image.

2. The apparatus according to claim 1, wherein the second readout mode and the third readout mode do not share any of the rows with the first readout mode.

3. The apparatus according to claim 1, wherein the second readout mode and the third readout mode do not share any of the rows with each other.

4. The apparatus according to claim 1, wherein at least one readout mode of the second readout mode and the third readout mode shares at least part of the rows with the first readout mode.

5. The apparatus according to claim 4, wherein both readout modes of the second readout mode and the third readout mode share at least part of the rows with the first readout mode.

6. The apparatus according to claim 1, wherein the second readout mode and the third readout mode do not share any of the output lines with the first readout mode.

7. The apparatus according to claim 1, wherein the second readout mode and the third readout mode do not share any of the output lines with each other.

8. The apparatus according to claim 1, wherein the total number of rows read out in the second readout mode and the total number of rows read out in the third readout mode are different from each other.

9. The apparatus according to claim 1, wherein the total number of output lines used in the second readout mode and the total number of output lines used in the third readout mode are different from each other.

10. The apparatus according to claim 1, wherein a period at which the second image is read out in the second readout mode and a period at which the third image is read out in the third readout mode are different from each other.

11. The apparatus according to claim 1, wherein the flicker information acquisition unit can acquire the flicker information based on the first image and the second image and can acquire the flicker information based on the first image and the third image.

12. The apparatus according to claim 1, further comprising a time changing unit configured to change an accumulation time of the second readout mode and an accumulation time of the third readout mode whenever the second readout mode and the third readout mode are performed a plurality of times.

13. The apparatus according to claim 1, the second image and the third image are each acquired in plurality.

14. The apparatus according to claim 1, wherein by adjusting the number of output lines used in the second readout mode and the number of output lines used in the third readout mode, the second readout mode and the third readout mode can operate at different timings.

15. The apparatus according to claim 1, wherein when the second image is read out in the second readout mode, a luminance of the second image is acquired,
    wherein when the third image is read out in the third readout mode, a luminance of the third image is acquired, and
    wherein the flicker information acquisition unit acquires a difference between the luminance of the second image and the luminance of the third image as the flicker information.

16. The apparatus according to claim 15, further comprising a determination unit configured to determine presence/absence of the flicker based on the difference.

17. The apparatus according to claim 1, wherein the captured image is a live view image.

18. The apparatus according to claim 1, wherein as the light source, a light source that periodically repeats blinking is used for the image capturing.

19. A method for controlling an apparatus, comprising:
obtaining a captured image by performing image capturing, by using a pixel area formed by a plurality of pixels arranged in a matrix and a plurality of output lines each of which reads out a signal from the pixel area for each of rows of the pixels; and
acquiring flicker information on flicker of the captured image caused by a light source,
wherein the capturing of the captured image is capable of being performed:
in a first readout mode in which signals of a first image formed by the captured image are each read out on a row-by-row basis,
in a second readout mode in which signals of a second image formed by part of the captured image are each read out on a row-by-row basis, during operation in the first readout mode, and
in a third readout mode in which signals of a third image formed by part of the captured image are each read out on a row-by-row basis, in a timing different from a timing of the second readout mode, during operation in the first readout mode,
wherein the acquiring of the flicker information can be performed based on the second image and the third image.

20. A non-transitory computer-readable storage medium storing a program for causing a computer to execute a method, comprising:
obtaining a captured image by performing image capturing, by using a pixel area formed by a plurality of pixels arranged in a matrix and a plurality of output lines each of which reads out a signal from the pixel area for each of rows of the pixels; and
acquiring flicker information on flicker of the captured image caused by a light source,
wherein the capturing of the captured image is capable of being performed:
in a first readout mode in which signals of a first image formed by the captured image are each read out on a row-by-row basis,
in a second readout mode in which signals of a second image formed by part of the captured image are each read out on a row-by-row basis, during operation in the first readout mode, and
in a third readout mode in which signals of a third image formed by part of the captured image are each read out on a row-by-row basis, in a timing different from a timing of the second readout mode, during operation in the first readout mode,
wherein the acquiring of the flicker information can be performed based on the second image and the third image.

* * * * *